United States Patent [19]
Cambray et al.

[11] Patent Number: 5,577,112
[45] Date of Patent: *Nov. 19, 1996

[54] TELEPHONY SYSTEM WITH SUPERVISORY MANAGEMENT CENTER AND PARAMETER TESTING WITH ALERTS

[75] Inventors: John E. Cambray, Pelham, N.H.; Andrew J. Scharmer, Tewksbury, Mass.

[73] Assignee: Davox Corporation, Westford, Mass.

[*] Notice: The portion of the term of this patent subsequent to May 28, 2011, has been disclaimed.

[21] Appl. No.: 370,990

[22] Filed: Jan. 10, 1995

Related U.S. Application Data

[63] Continuation of Ser. No. 706,251, May 28, 1991, Pat. No. 5,381,470.

[51] Int. Cl.[6] .............................. H04M 1/26; H04M 3/22; H04M 3/46

[52] U.S. Cl. .......................... 379/216; 379/34; 379/218; 379/265

[58] Field of Search .................................. 379/216, 201, 379/218, 92, 265, 266, 309, 34

[56] References Cited

U.S. PATENT DOCUMENTS

| | | | |
|---|---|---|---|
| 4,071,698 | 1/1978 | Barger, Jr. et al. | 379/84 |
| 4,763,353 | 8/1988 | Canale et al. | 379/157 |
| 4,785,408 | 11/1988 | Britton et al. | 395/2.79 |
| 4,797,911 | 1/1989 | Szlam et al. | 379/67 |
| 4,817,130 | 3/1989 | Frimmel, Jr. | 379/88 |
| 4,823,108 | 4/1989 | Pope | 345/120 |
| 4,829,514 | 5/1989 | Frimmel, Jr. et al. | 379/89 X |
| 4,829,563 | 5/1989 | Crockett et al. | 379/309 |
| 4,845,739 | 7/1989 | Katz | 379/92 |
| 4,908,850 | 3/1990 | Masson et al. | 379/88 |
| 4,922,519 | 5/1990 | Daudelin | 379/67 |
| 4,926,462 | 5/1990 | Ladd et al. | 379/67 |
| 5,012,512 | 4/1991 | Basso et al. | 379/218 |
| 5,097,528 | 3/1992 | Gursahaney et al. | 379/67 |

OTHER PUBLICATIONS

"Conversant 1 Voice Systems: Architecture and Applications," R. J. Perdue et al. *AT&T Technical Journal*, vol. 65, No. 5, Sep./Oct. 1986, pp. 34–47.

"NGT's Merge Prospector", product description, *Inbound/Outbound Magazine*, Jul. 1989, pp. 62–63.

*Primary Examiner*—Thomas W. Brown
*Attorney, Agent, or Firm*—Daniel J. Bourque; Kevin J. Carroll

[57] ABSTRACT

A smart telecommunications supervisor management workstation with monitoring system provides real-time operation statistics and graphical representation of system operation in real time. A standardized graphic user interface and a mouse-driven point and click user friendly interface minimize keyboard entry. A management workstation also generates reports using off-the-shelf spreadsheet packages incorporates data management functions via a highly refined user interface. The management workstation comprises an integrated system for generating alerts based on user-defined criteria for database information. Color-coded or shaded monochrome displays provide ease of viewing. Extensive use of icons allows quick identification and selection of management control functions.

9 Claims, 39 Drawing Sheets

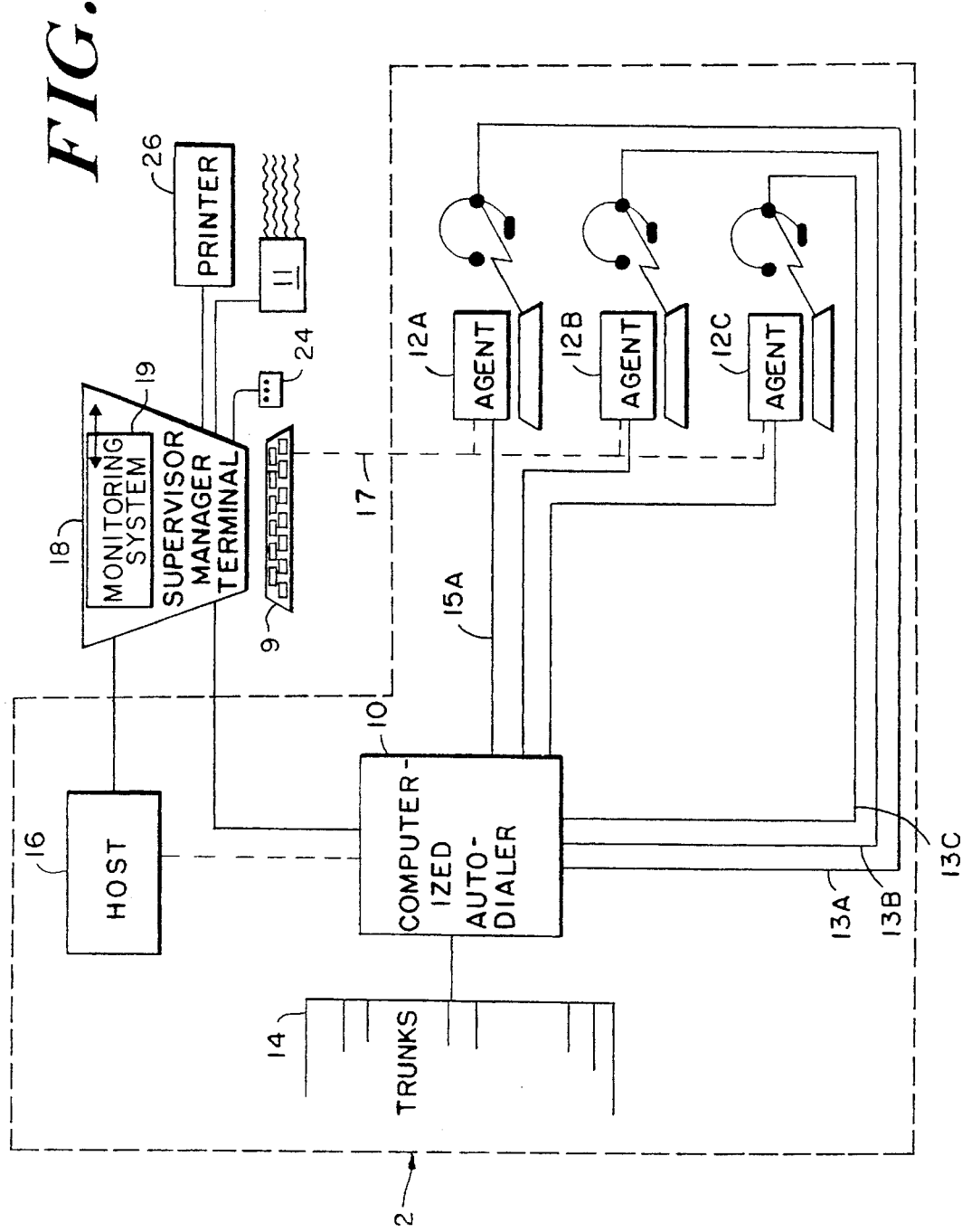

SMCB, Main Menu

Page-1

Smart Management Center

To open the manual, position the pointer on a topic and click the left mouse button.

DAVOX SMC
SMC Icon

1: Getting Started
- ☐ How to Use This Manual
- ☐ SMC Screens & Mouse
- ☐ Printing the SMC Manual
- ☐ SMC Main Menu Panel 2: System Management
- ☐ Lines
- ☐ Lists
- ☐ Operators
- ☐ ALERTS Tools continued...
- ☐ Sync Date & Time
- ☐ Letter
- ☐ Manager Tools
- ☐ Speech File Maintenance 5: Data Management
- ☐ Up/Download
- ☐ Pre-/Post-Process
- ☐ Reports 6: Spreadsheet

*FIG. 5A*

Creating/Modifying/Deleting Alerts

Alerts Utility Screen

Alerts are created, modified, and deleted from the Alert Utility Screen.

Creating an Alert

To create a new alert, select an active alert with the left mouse button. This alert will act as the "boilerplate" for the new alert. The current settings at the selected alert will display in the list of alert parameters in the middle of the screen.

*FIG. 5F*

When you dismiss an alert, the alert is temporarily deactivated. The alert stays deactivated until the "Wait Time" specified for the alert is over. This gives you time to address the condition giving rise to the alert. After the waiting period is over, the alert re-checks for the alert condition. If the condition exists, the alert message returns.

In situations where you cannot change the alert condition, and do not wish to be re-alerted, you have two alternatives.

First, you can delete or modify the alert from the Alert Utility Screen.

Alternatives...

*FIG. 5K*

Iconizing an
Alert Message

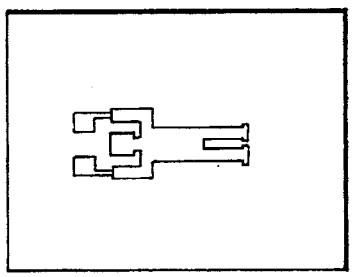

Secondly, you can "iconize" the alert message. To "iconize" the alert message is to save it as a small flagging icon at the bottom of the screen. As long as the message is iconized, the alert will remain deactivated and you will receive no further messages. To iconize the alert, left-click on the small inverted triangle button in the top left corner of the message. To restore the alert message, double-click on the icon.

*FIG. 5L*

SMC2 Alerts

Alerts

*32b* avg hold time

Page - 26

Average Hold Time is the average length of time that a customer waits for an operator after answering a call. Average Hold Time is calculated from all calls, including calls that don't go on hold (= calls with zero hold time). Average Hold Time is the pacing value used in Goal Average Hold Time Mode.

*FIG. 5M*

| Field | Description |
|---|---|
| avg operator talk time | Average Operator Talk Time is the average amount of time that an operator stays connected to a customer, once connected. |
| % of aborted calls on hold | % of Aborted Calls on Hold is the percentage of calls put on hold that the customer hangs up on. The percentage is calculated from all calls that are placed on hold. |
| % of dropped calls on hold | % of Dropped Calls on Hold is the percentage of calls put on hold that the Dialer terminates. (The Dialer can be instructed to drop a call if an operator does not become available within a specified time period.) |

*FIG. 5N*

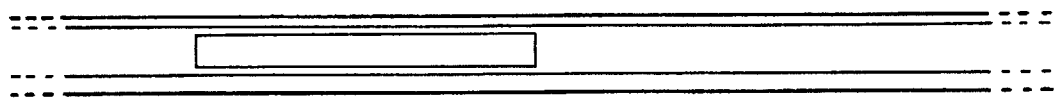

Figure 2-7 List of Active Alerts from Alert Utility Screen

The entire list may be printed out using the Print Button at the bottom of the screen.

One alert in the list will always be selected (highlighted). The current settings of the highlighted alert are reflected in the list of alert parameters in the middle of the screen. These settings may be changed to either "modify" the highlighted alert, or "insert" a new alert into the list.

See "Creating/Modifying/Deleting Alerts" for more information.

*FIG. 5Q*

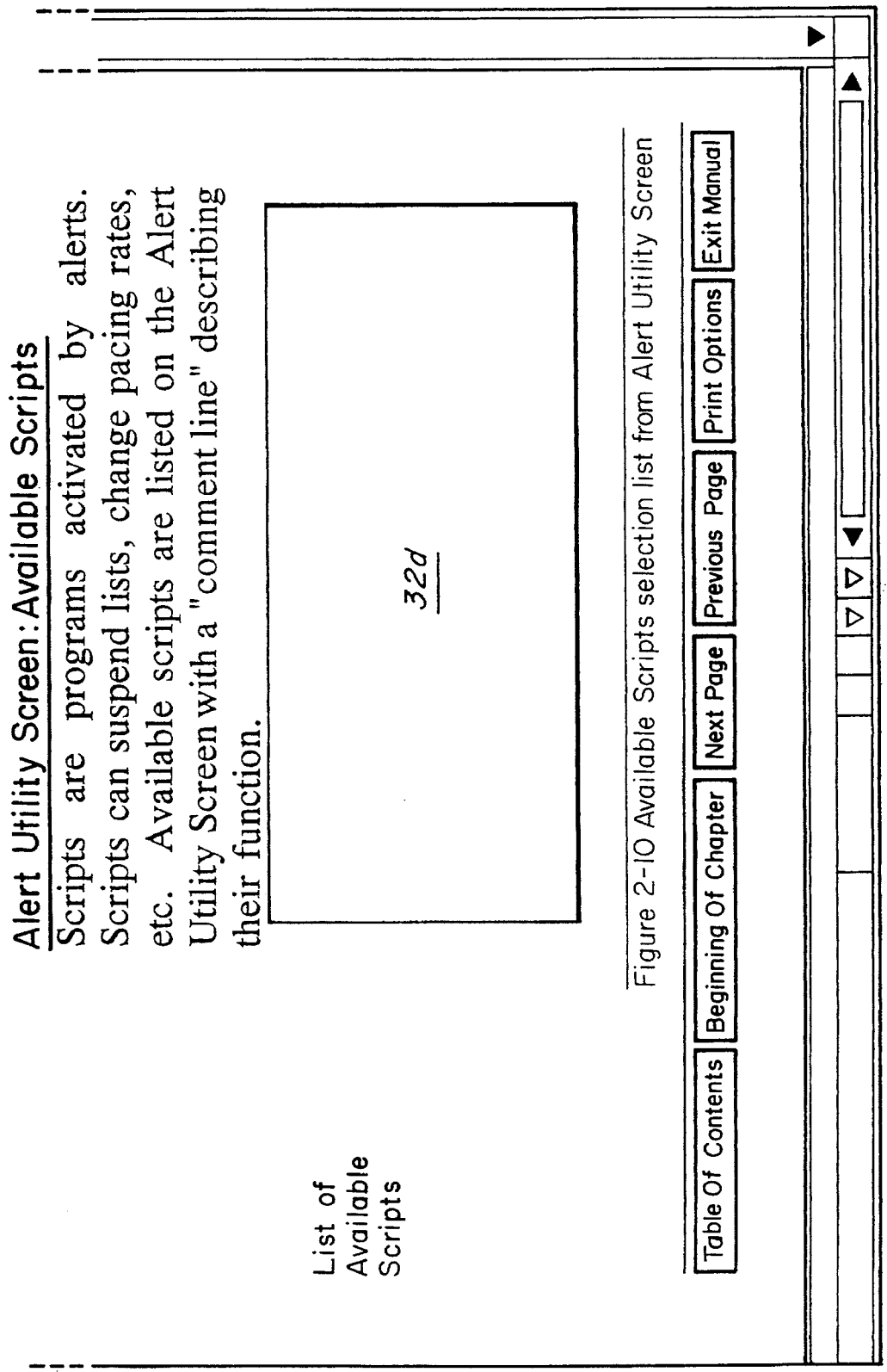

SMC2 Alerts

Alerts

In addition to the stock scripts displayed above, custom scripts can be developed by DAVOX representatives.

To assign a script to an alert, select "Script" as the alert Notify Method. (Notify Method is one of the alert variables on the Alert Utility Screen.). Then select a script from the list of Available Scripts.

<u>Alert Utility Screen: Alert Parameters</u>

Alerts are defined from a list of parameters displayed on the Alert Utility Screen.

*FIG. 5U*

ALERT PARAMETERS

32e

Figure 2-11 Alert Parameters on Alert Utility Screen

ALERT event    Alert Event defines type of event that triggers the alert. You select the Alert Event type from the ALERT Event Selection List. The event type selected displays in the blank.

Relationship    Relationship sets the relationship (equal to, greater than, etc.) between the alert event and the alert value. For example, an alert could be set to go off if the average talk time becomes greater than 30 seconds, or less than 30 seconds, etc.

Relationship is selected from a pull-down menu which displays

| Table Of Contents | Beginning Of Chapter | Next Page | Previous Page | Print Options | Exit Manual |

*FIG. 5W*

SMC2 Alerts

Alerts                                              Page-29 when you click the right mouse button on the relationship button.

Depending upon the type of alert, you can assign a numeric value, a percentage value, or a time-of day value. The appropriate heading/prompt will display for the type of event selected.

Value,
Percentage,
Time (h:m:s)

(Numeric) Values is assigned to alerts such as "number of abandoned calls". To assign a numeric value you type a number in the blank (The back-delete key erases the existing number).

*FIG. 5X*

Percentage value is assigned to alerts such as "% of aborted calls on hold". To assign a percentage value you drag the marker along the scale with the left mouse button.

Time (h:m:s) value is assigned to alerts such as "average talk time." Time value is selected from a pull-right menu displayed from the Time (h:m:s) button using the right mouse button.

Start Time is the time of day an alert becomes active. You select Start Time from a pull-right menu displayed from the START Time button using the right mouse button. (Select N/A if the alert is not to be time activated.)

START Time

*FIG. 5Y*

| | |
|---|---|
| STOP Time | Stop Time is the time of day an alert is turned off. Select Stop Time from a pull-right menu displayed from the STOP Time button using the right mouse button. (Select N/A if the alert is not to be deactivated.) |
| Wait Time | Wait Time is the time the SMC waits after an alert occurs before re-checking for the alert condition. Wait Time should be long enough to give the supervisor time to correct the condition before being "re-alerted". Wait Time is selected from a pull-right menu displayed from the Wait Time button using the right mouse button. |

*FIG. 5Z*

TELEPHONY SYSTEM WITH SUPERVISORY MANAGEMENT CENTER AND PARAMETER TESTING WITH ALERTS

This application is a continuation of application Ser. No. 07/706,251, filed May 28, 1991, now U.S. Pat. No. 5,381,470.

FIELD OF THE INVENTION

The present invention relates to supervisor management systems and, in particular, to a supervisor management workstation in a telephone information database system.

BACKGROUND OF THE INVENTION

Automated telephone systems are known which coordinate and optimize performance of operators of facilities for out-dialing large volumes of telephone calls and receiving large volumes of telephonic requests for information. Such systems typically involve a plurality of operators using telephones and operating terminals connected to computerized telephone management systems, called autodialers, which improve the efficiency of operations with high volume outbound calling requirements. Computerized autodial systems increase operator or agent productivity significantly and provide management with a tool for streamlining and controlling operations. These systems automatically place outbound calls from a predetermined list of phone numbers and keep track of no answers, busy signals, and other line conditions and connect live calls to an agent who is simultaneously furnished a data screen having information regarding the account of the phone number reached. In high volume calling operations, such as collections, direct telephone sales, fund raising and market research/polling, among others, these systems provide flexibility in the rate of call placement and can provide significant data management options.

Typical autodialing systems compile statistics relating to call scheduling, such as number of calls made per agent, average talk time and number of unanswered calls. Such information is typically maintained in a database in the autodialing system and can be compiled and massaged for batch report generation. Thus, reports based on statistics compiled by the automated out-dial system typically are not available to management until all data is transferred, received and processed at the end of a calling campaign. Such systems are of limited efficacy in keeping a supervisor apprised of the success or progress, or lack thereof, of an in-progress campaign.

SUMMARY OF THE INVENTION

A smart telecommunications supervisor management workstation is provided which has capabilities for accessing real-time operation statistics and providing graphical representation of system operation in real time so that a supervisor can be fully apprised of the progress of a running campaign and can make decisions or effectively implement strategies necessary to optimize productivity and effectiveness.

According to the invention a management workstation comprises an integrated system for generating alerts based on management/user-defined criteria relating to stored system parameter and campaign performance information or events. The system supervisor can specify events and conditions which will trigger real-time notification or "alert" when a user defined condition exists between a system parameter and a received parameter event. The "alert" can be in the form of an audible tone, or a screen message. Optionally, a user-defined program or "script" can be invoked upon detection of the alert, to direct the system to perform in accordance with a predetermined response. The management workstation according to the invention also provides the capability of generating reports using off-the-shelf spreadsheet packages and incorporates data management functions via a highly refined user interface.

Features of the invention include a standardized graphic user interface and a mouse-driven point and click user friendly interface minimizing keyboard entry. Color-coded or shaded monochrome displays provide ease of viewing while extensive use of icons allows quick identification and selection of management control functions.

DESCRIPTION OF THE DRAWING

FIG. 1 is a block diagram of a data processing device 2 such as a computerized autodial system having a supervisory management center terminal according to the invention;

FIGS. 5A–5Z and 5A-1 are on-line instructional manual informational pages explicating alerts features and operation;

Further information about the alerts function according to the invention is presented in Appendix\I attached hereto and hereby incorporated by reference.

DETAILED DESCRIPTION OF THE INVENTION

Figure 5B:
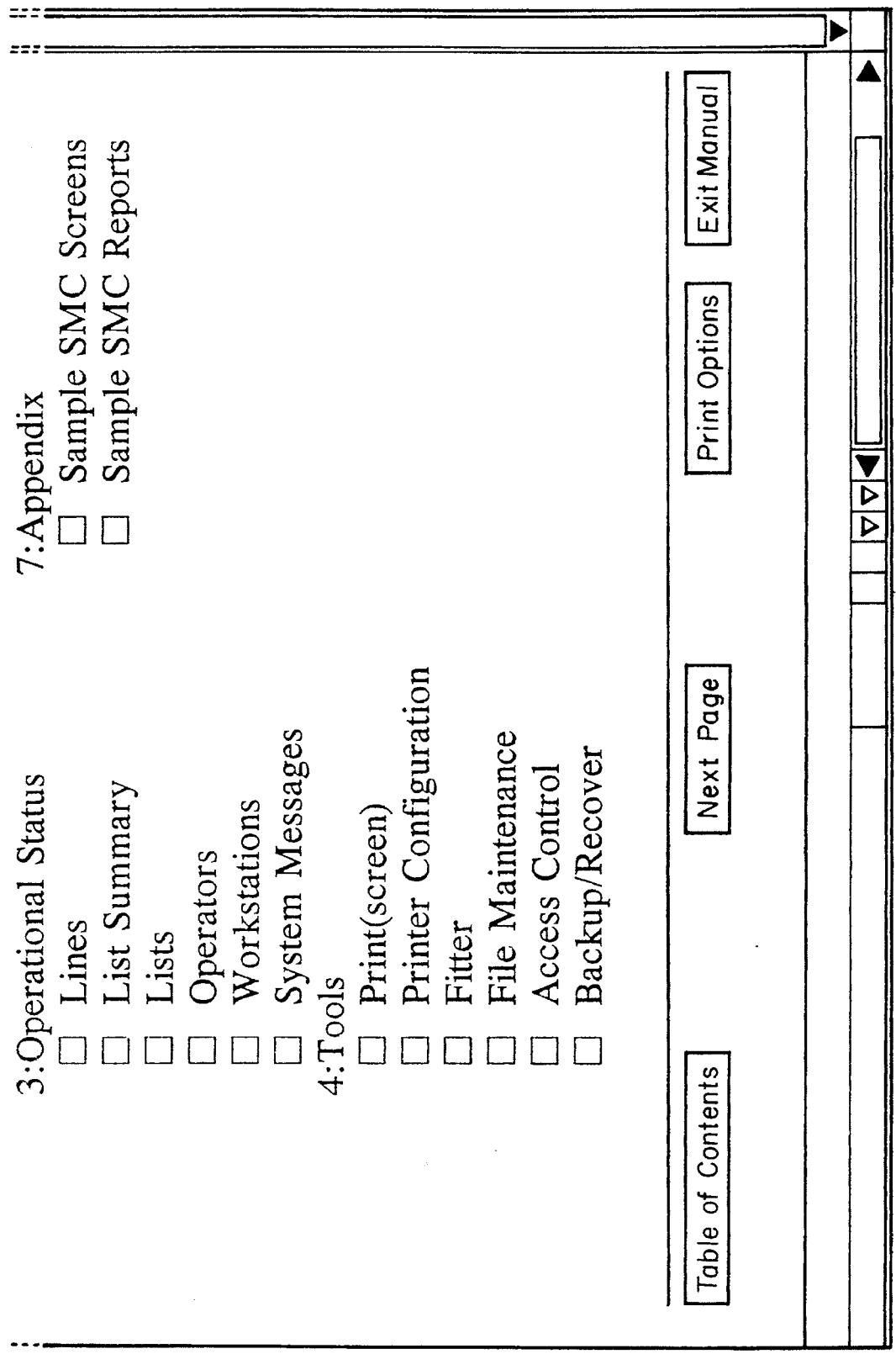
Figure 5C:
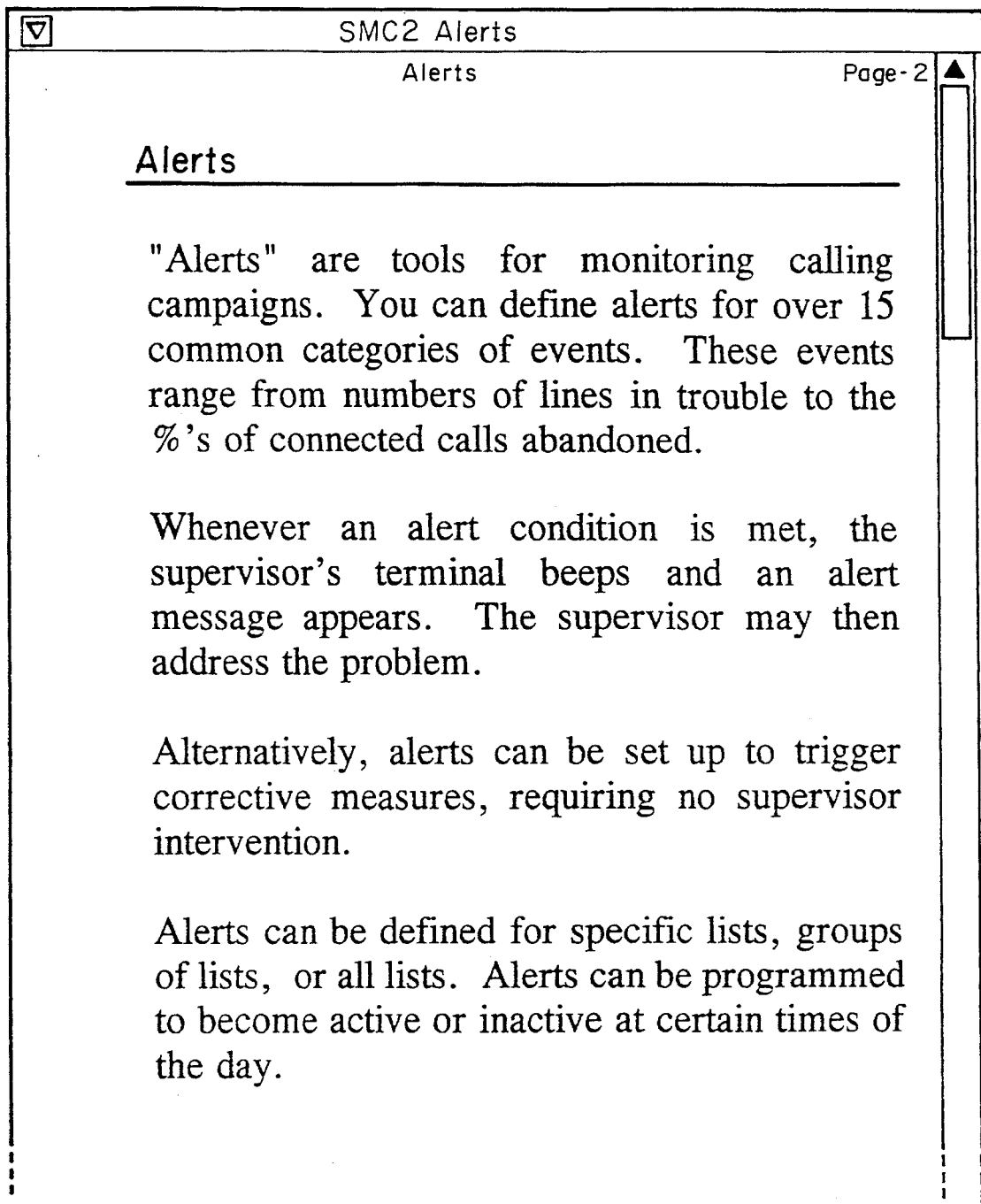
Figure 5D:
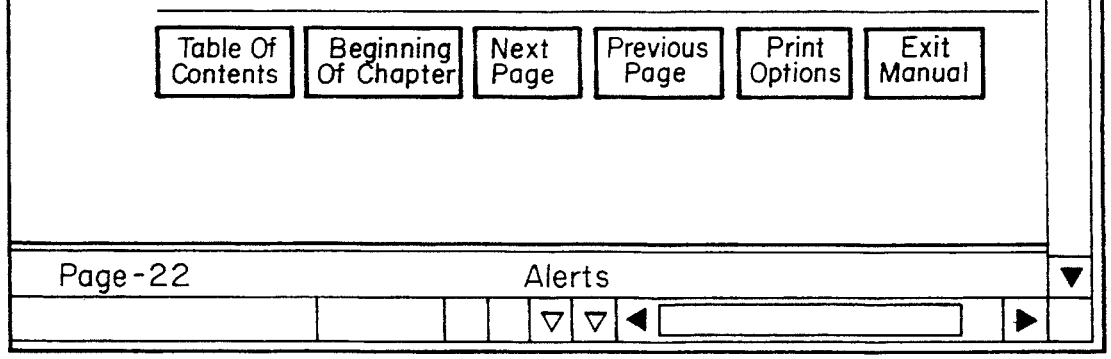
Figure 5E:
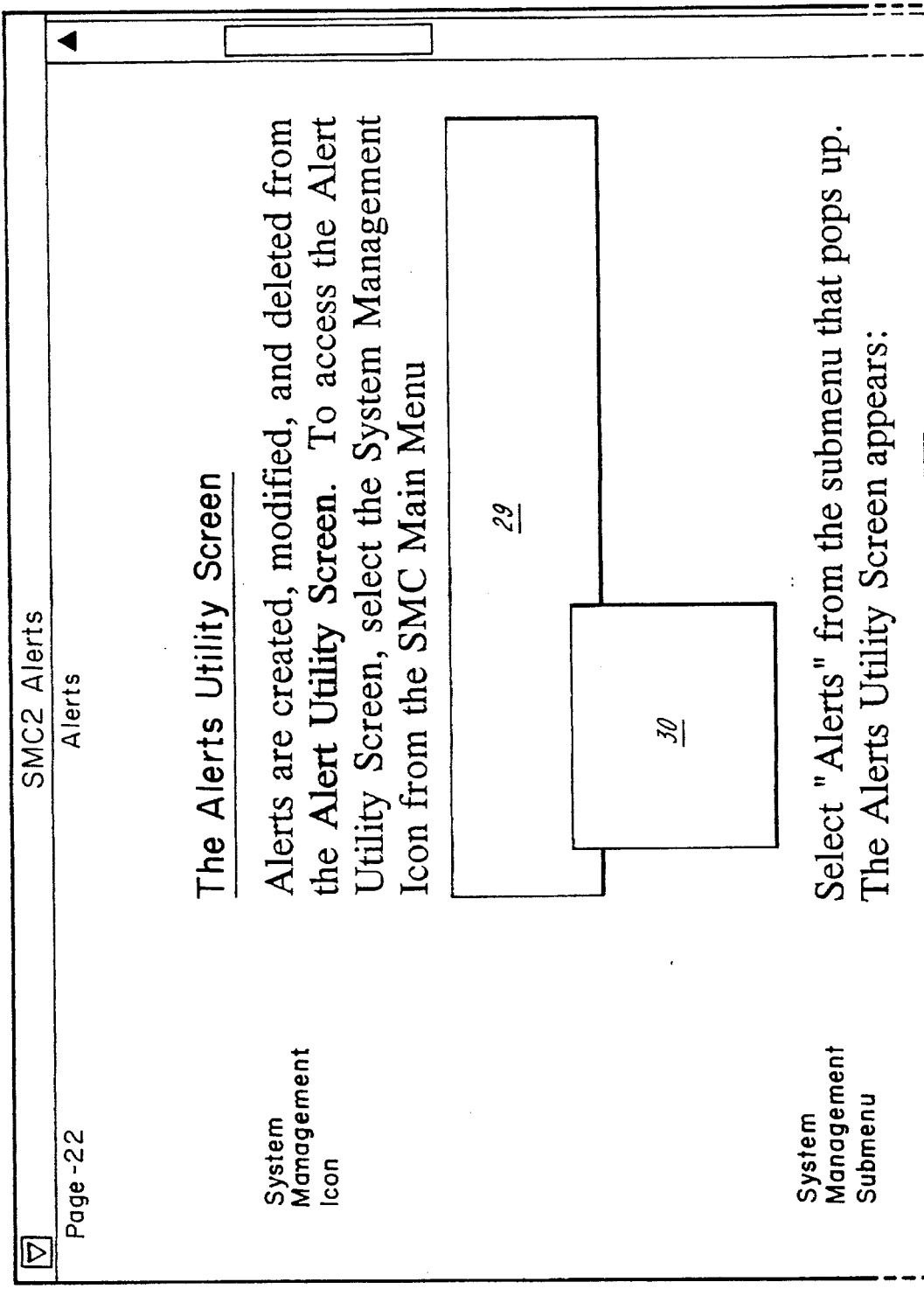
Figure 5G:
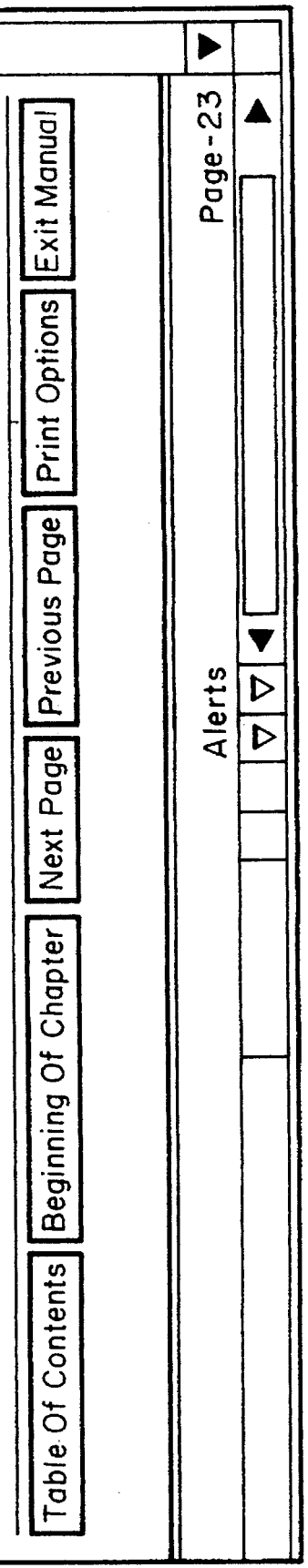
Figure 5H:
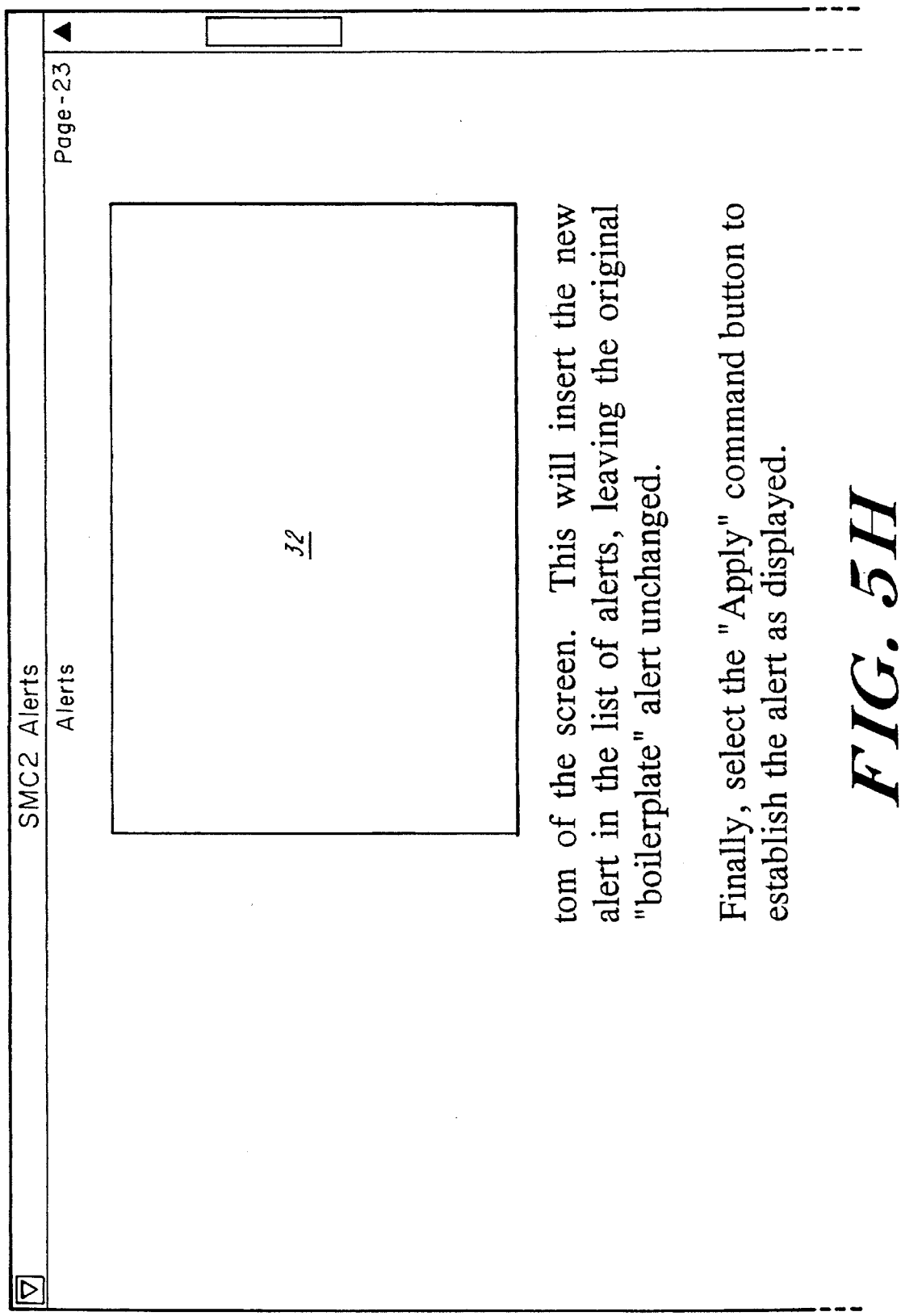
Figure 5J:
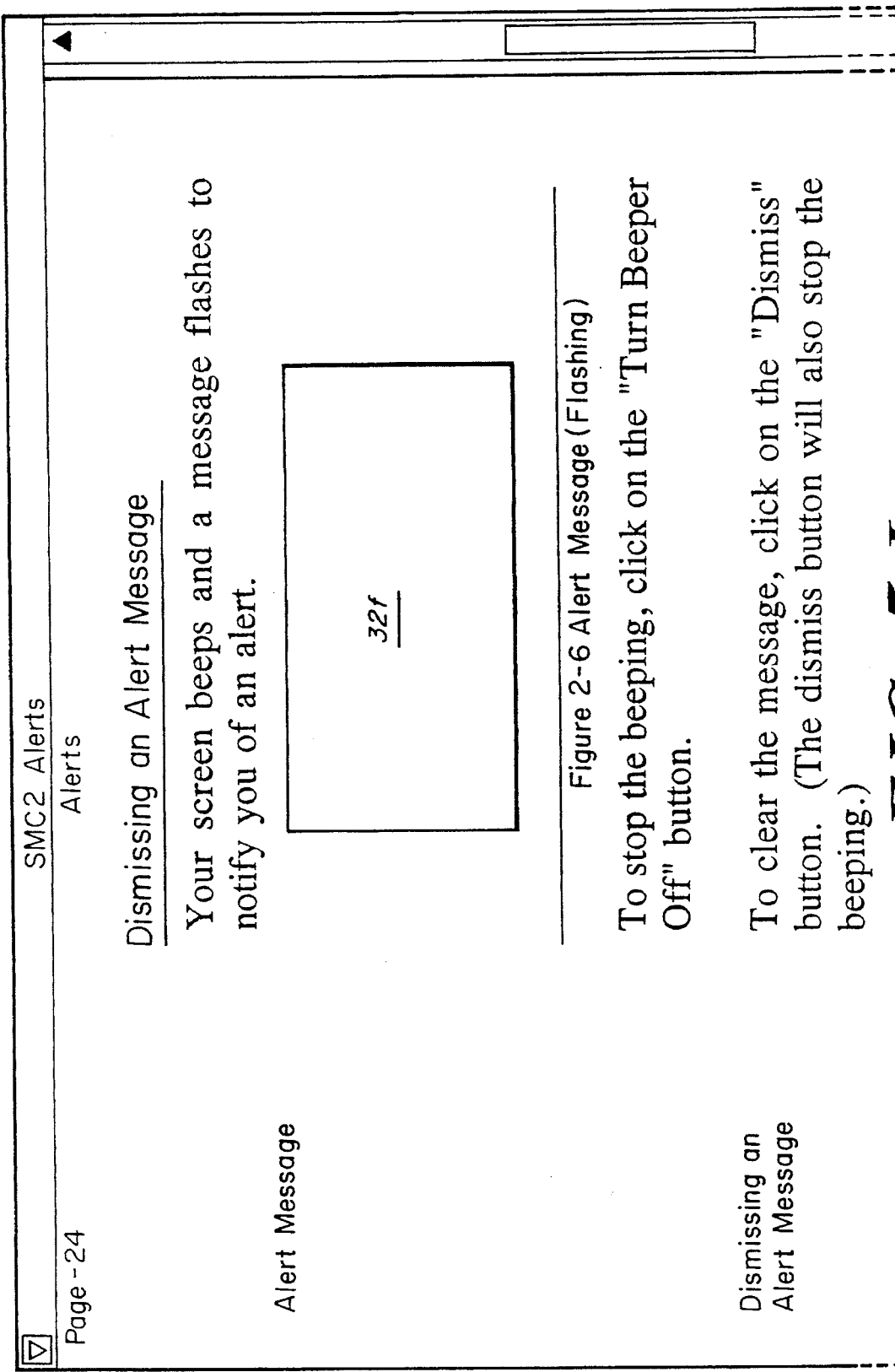
Figure 5P:
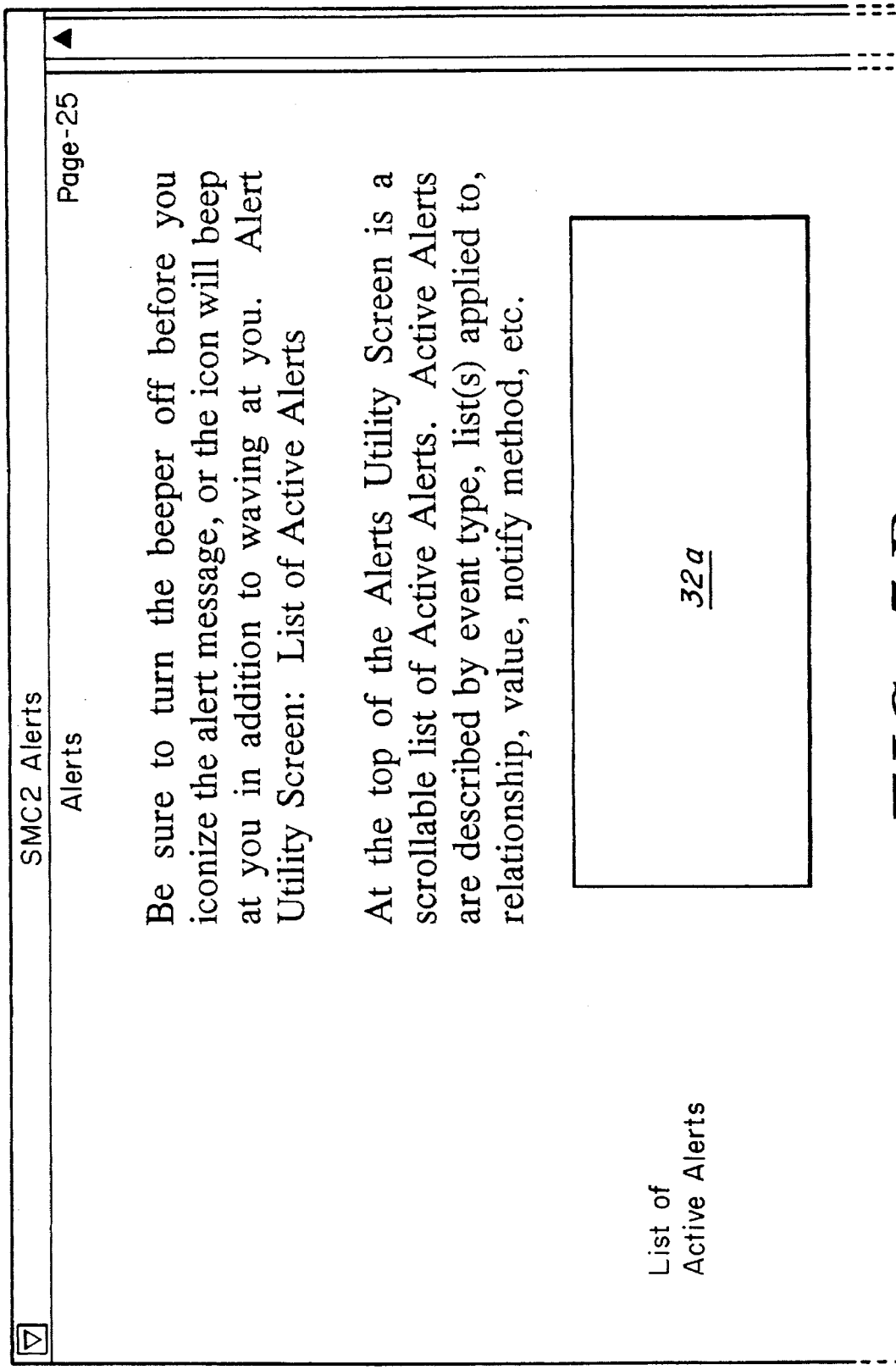
Figure 5R:
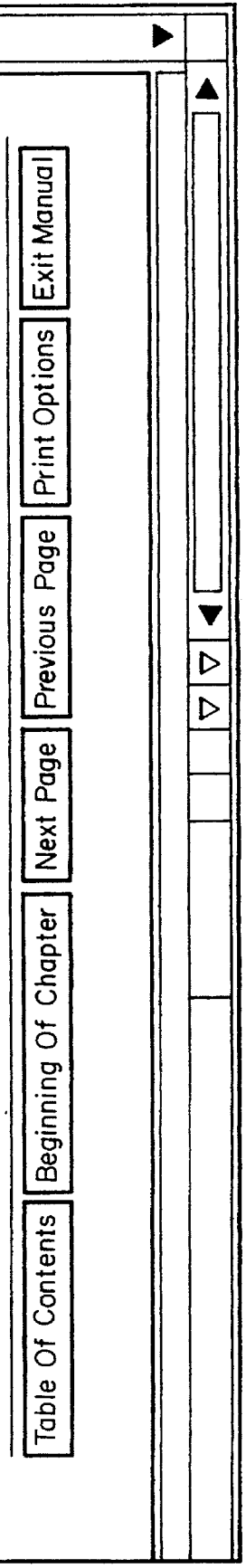
Figure 5S:
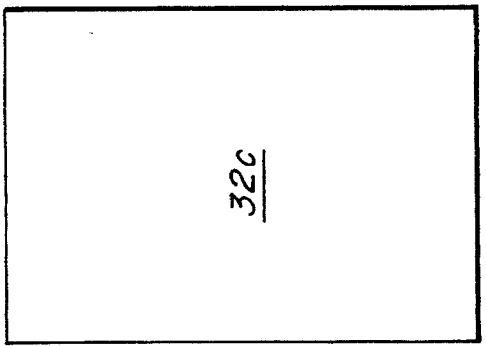
Figure 5V:
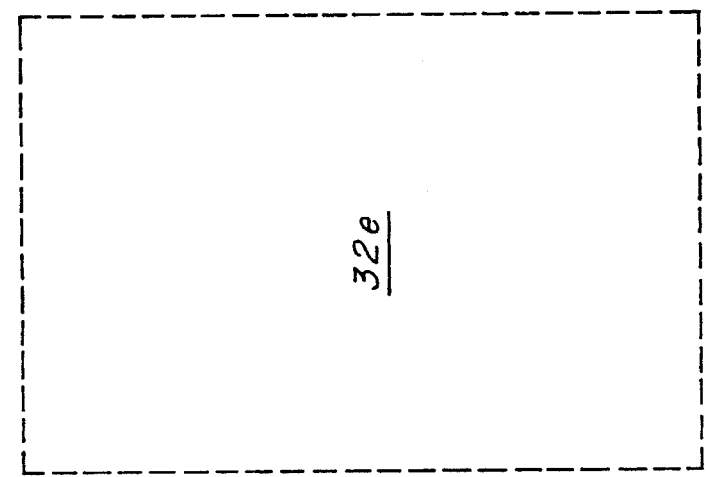
Figures 1, 5A:
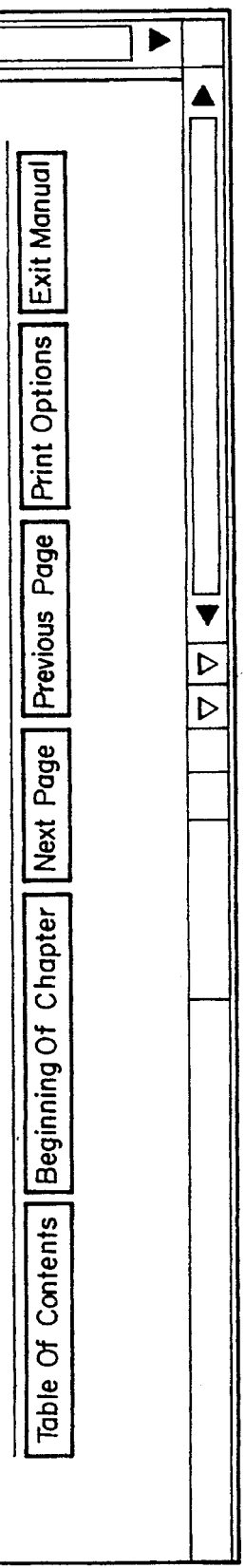

Referring now to one embodiment of the present invention shown in FIG. 1, a data processing device 2 such as a computerized autodialing system, typically used in high volume out-dialing environments such as collection departments, incorporates a computerized autodialer 10, as the hub of the automated system. A plurality of agent terminals 12A, 12B, 12C are connected to the computerized autodialer which automatically dials out-bound calls from a predetermined list of phone numbers over a variable number of phone lines or trunks 14. The computerized autodialer 10 generates event signals upon the occurrence of events such as no answers, lines that are busy, network intercepts or lines answered by message machines, and connects live calls to any one of the several agents 12A–12C over voice transmission lines 13A–13C. Upon transferring a live call to any one of the several agents, the computerized autodialer 10 also transfers selected data to the agent terminal over a data associated with the call transmission line 15A–15C. Alternatively, data may be transferred over any optional network line 17 to the agent through a supervisor/manager terminal 18 discussed hereinafter. The furnished data may be retrieved by the autodialer 10 from a host computer 16 having mass storage and database management capabilities. The data furnished to the agent from the host 16, through the computerized autodialer 10 or the supervisor/manager terminal 18, typically is account information. The account information matches or is associated with the answered phone number processed by the autodialer 10. The agent receiving the live call addresses queries and/or collects information, accessing the host 16 database to store or retrieve the required information.

The autodialer 10 continues automatically placing outbound calls and directing them to available agents while generating event signals in response to the placed calls and also transmitting event signals which can be utilized to generate statistics on agent and system performance.

Figure 2:
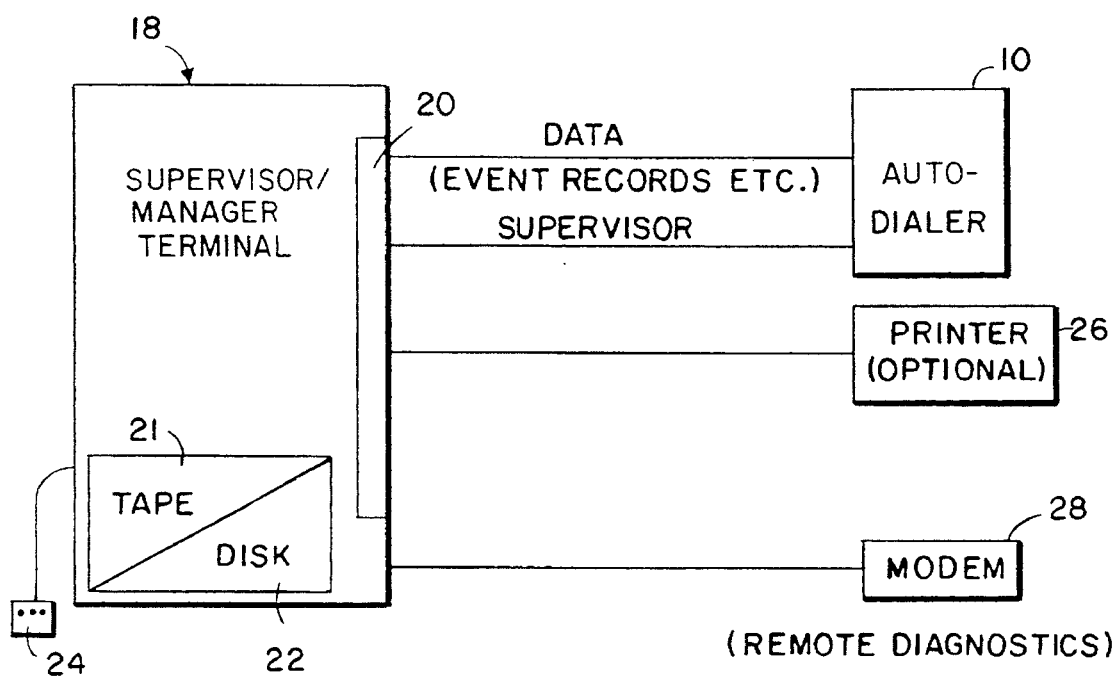
FIG. 2 is a block diagram of a smart management center implementing the supervisory management system.

The supervisor/manager terminal 18 as illustrated in FIGS. 1 and 2, is linked to the computerized autodialer 10 and assists in the management of the autodialer, and comprises an integrated monitoring system 19 for providing the supervisor real-time access regarding the autodialer system and the campaigns that it is processing. The supervisor/manager terminal 18 is preferably a smart terminal such as a reduced instruction set computer based parallel processing unit utilizing a UNIX Operating System, such as a Sun Sparc UNIX workstation. Alternatively, other UNIX based platforms can be used, such as a 486 based P.C. running UNIX or an IBM\RS6000, for IBM compatibility. The processor can be loaded to run off-the-shelf software for generating the user interface and accessing the database resident on the host 16. Preferably, the supervisor/manager terminal 18 is configured with a multiport synchronous/asynchronous interface 20 and substantial mass storage capabilities such as a tape drive 21 for system backup and a disk drive 22 for maintaining a supervisor/manager terminal 18 resident database. A point and click mouse 24 having as many as three\buttons, provides a suitable user interface to permit minimization of keyboard entries on keyboard 9. The supervisor/manager terminal 18 is interfaced to the computerized autodialer 10 through the synchronous/asynchronous interface 20 to pass and receive data, such as event records therebetween. A printer 26 can optionally be dedicated to the supervisor/manager terminal 18 to provide hard copy output of reports generated at the terminal using an off-the-shelf spread sheet package. Optionally, a modem 28 can be provided for remotely accessing the supervisor/manager terminal 18 for performing system diagnostics and debugging from remote sites.

It is desirable to store data/information associated with the autodialer 10 in a database supervised by and accessible to the supervisor/manager terminal 18. An integrated relational database of calling records, event logs, operator tables and all other data required for or generated from dialing are maintained in a database 220 which is part of monitoring system 19, FIG. 7, and on the disk drive 22. Data files preferably are maintained, within a relational database such as Sybase database management system, and are accessible to the autodialer 10 and the smart management center supervisor/manager terminal 18 via an interactive query language such as by standard query language (SQL) commands.

A graphical user interface facilitates data access and manipulation and process monitoring and control through the point and click mouse 24 user interface which is menu and icon driven in accordance with a graphical user interface based on Open Windows running under the UNIX Operating System. Icon features enable a supervisor, using the mouse 24, to quickly move between functions by pointing and clicking to select either information or actions available on the supervisor/manager terminal 18.

Figure 3A:
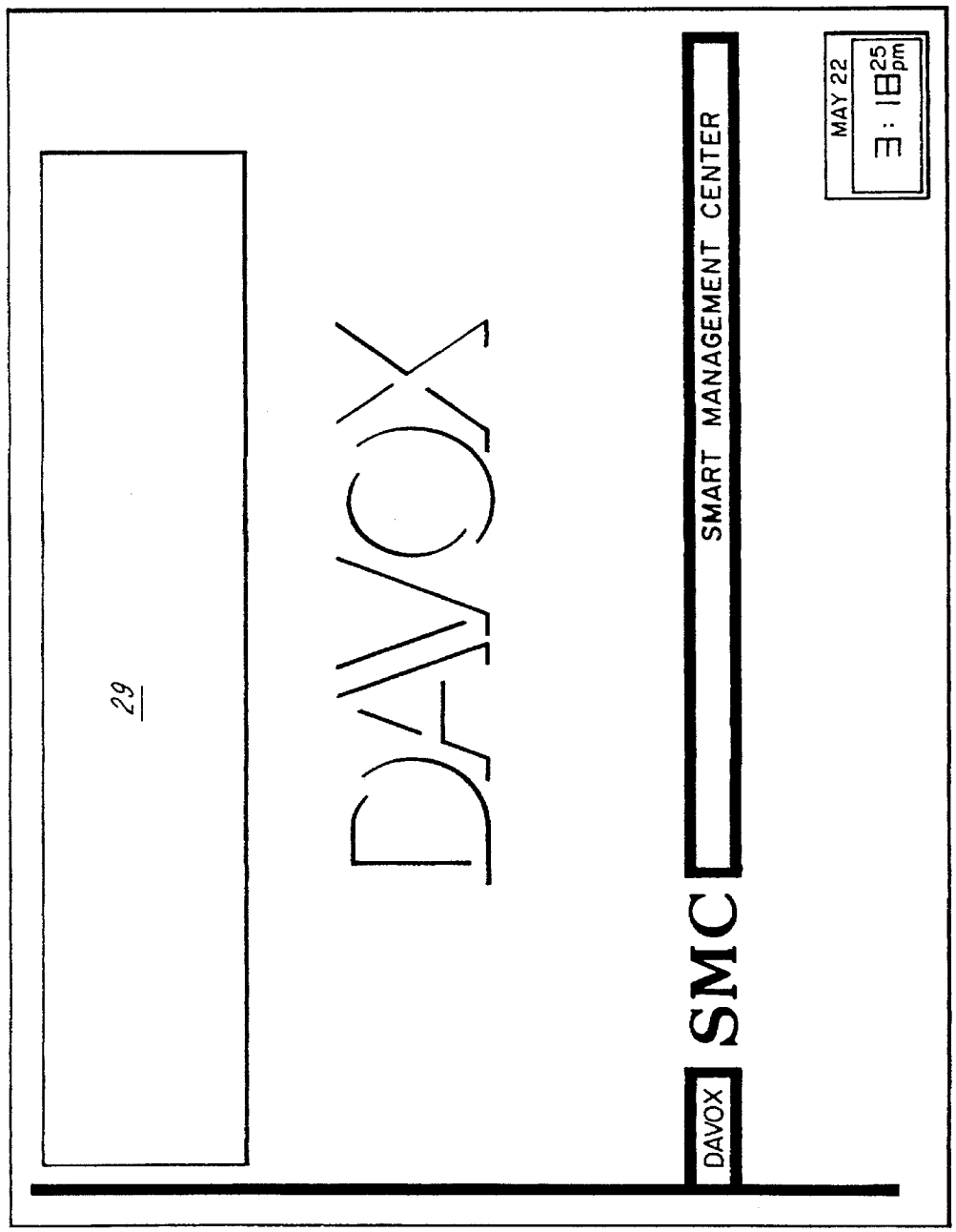
FIGS. 3A–3E are menu screens for invoking alerts from the smart management center.
Figure 3B:
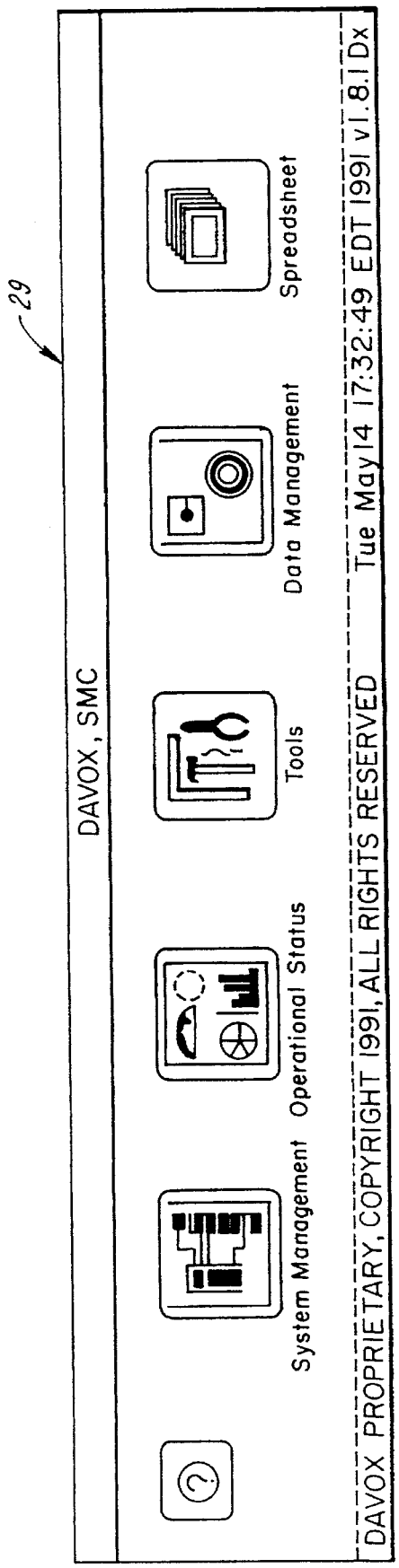

Major supervisory functions are identified on the supervisor/manager terminal 18 by icons 29, as illustrated in FIGS. 3A and 3B and further discussed hereinafter.

By pointing and clicking, for example, on the SPREADSHEET function the supervisor has access to spreadsheet report generation capabilities in accordance with the off-the-shelf spreadsheet available as discussed hereinbefore. The DATA MANAGEMENT icon encompasses utilities for uploading, downloading and accessing data as reports. The TOOLS icon relates to ancillary tools such as printer control, file maintenance, and other tasks that must be accessed to facilitate dialer operations.

The OPERATIONAL STATUS icon, as the name implies, permits the supervisor access to all status information available on the computerized autodialer 10. The supervisor can access for review, information pertaining to lines used and unused, lists, operator or agent data, workstation status information and system messages. While such information is available for review under the OPERATIONAL STATUS icon, any changes must be made thereto using facilities under the SYSTEM MANAGEMENT icon.

Figure 3C:
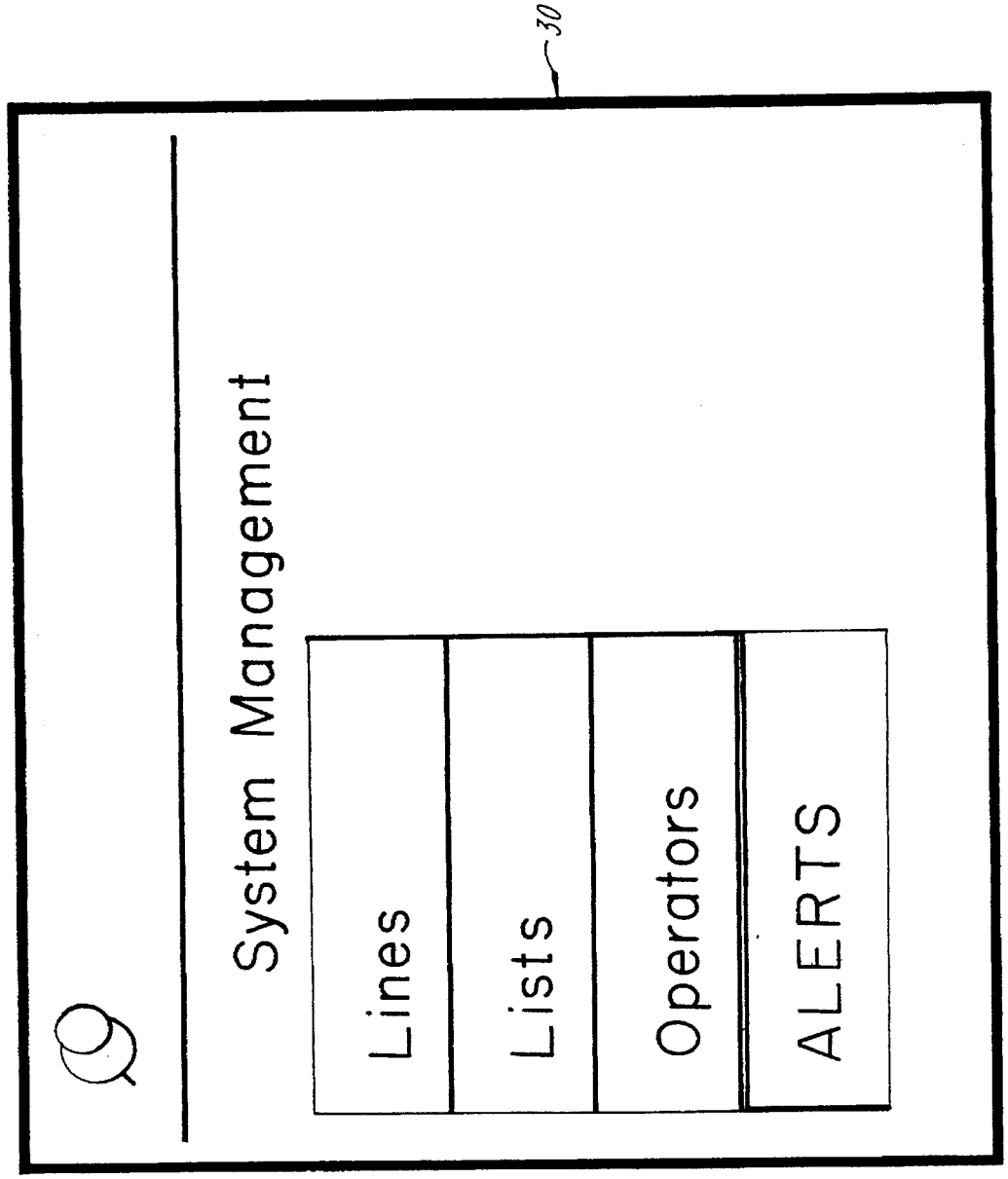
Figure 6A:
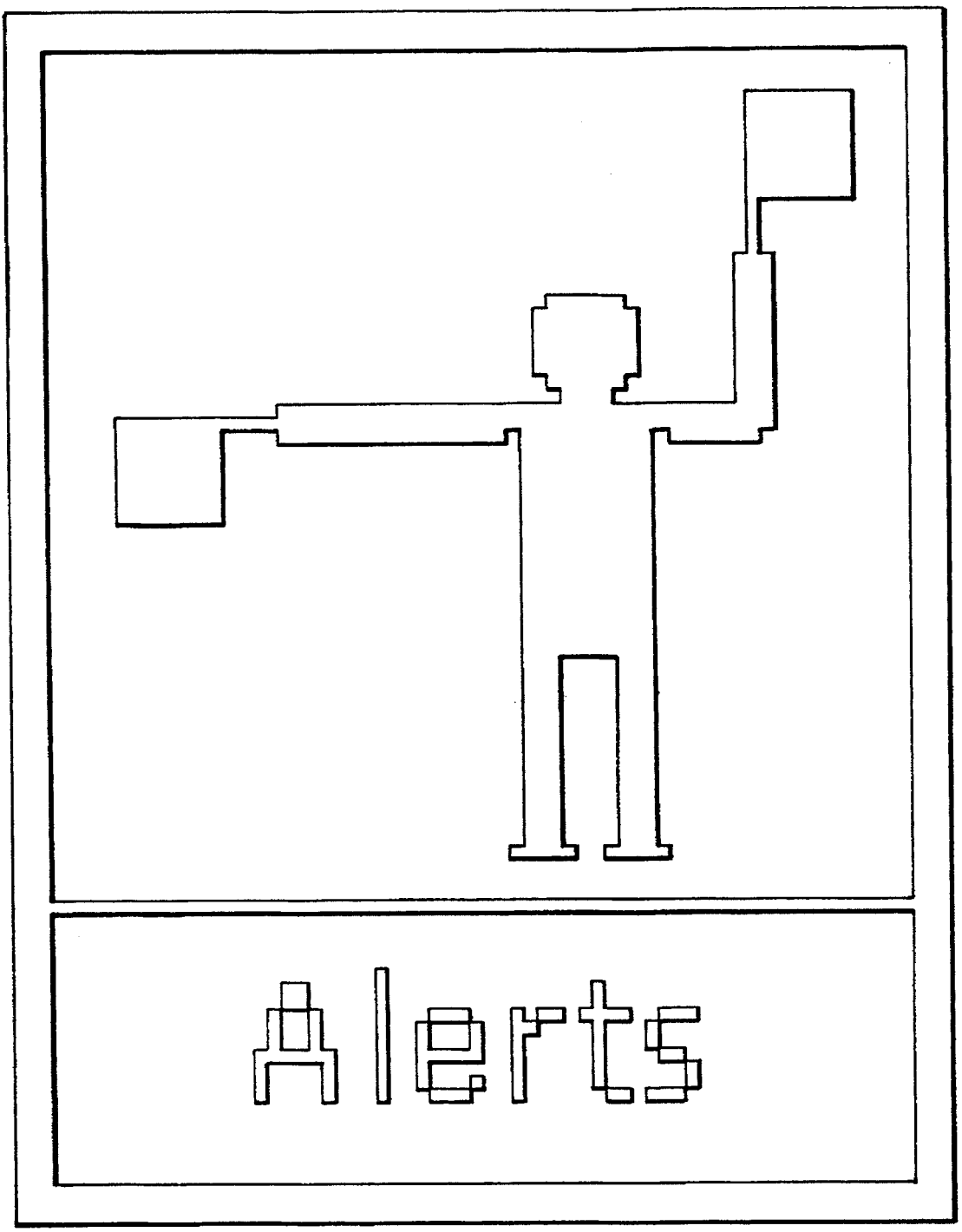
FIGS. 6A–6C are illustrations of alert notifications.
Figure 6B:
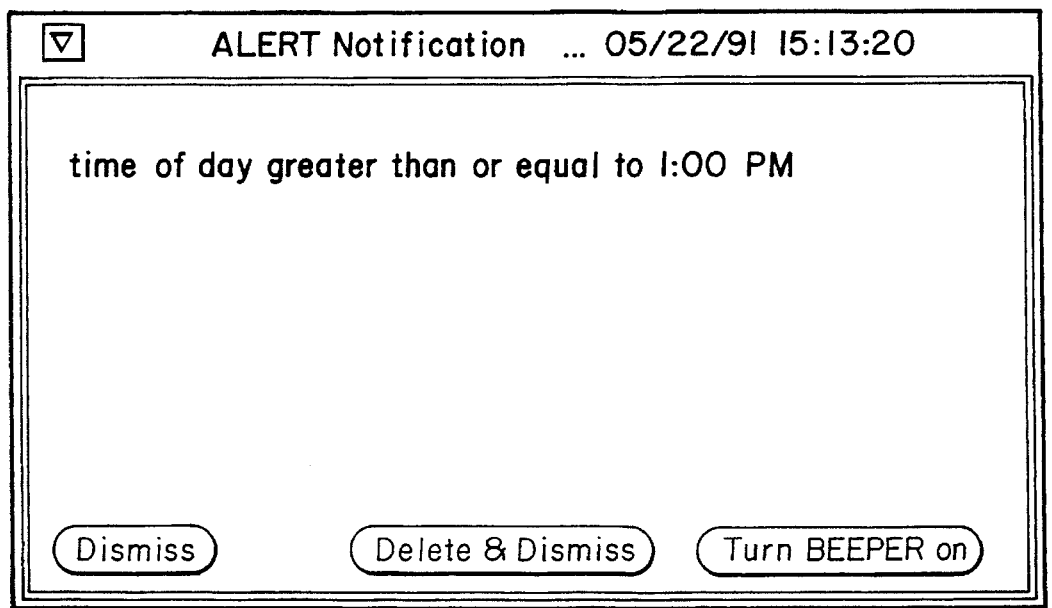
Figure 6C:
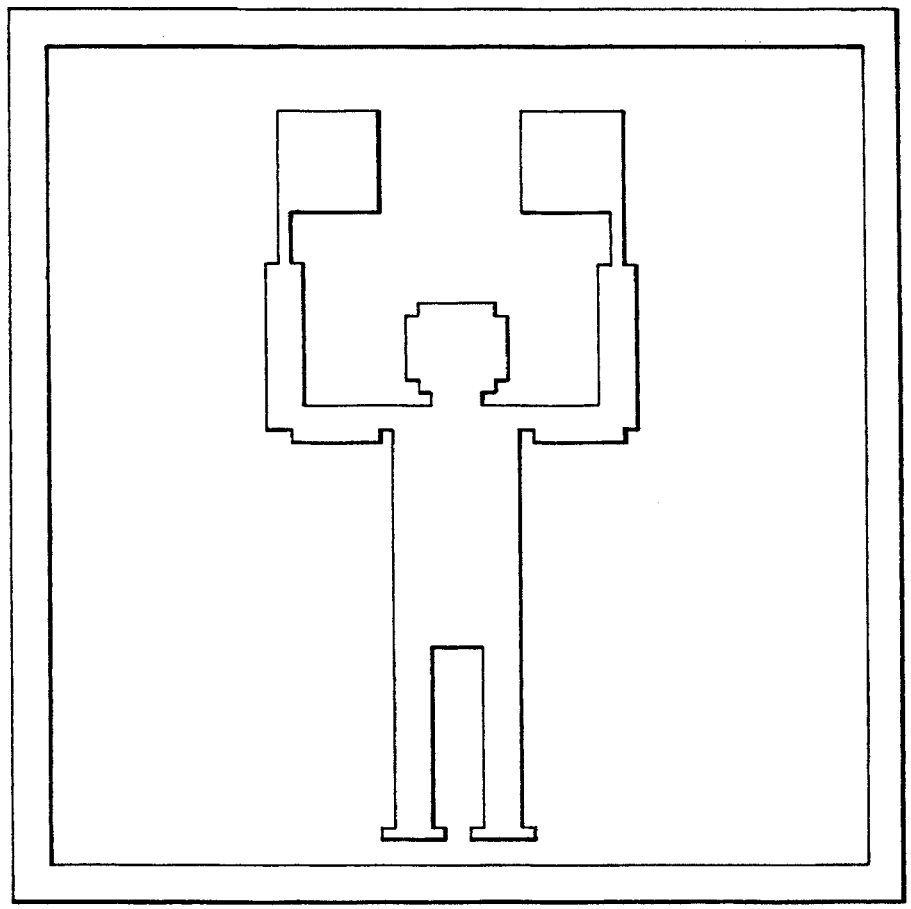

As illustrated in FIG. 3C, the SYSTEM MANAGEMENT icon 30 also provides the supervisor access to the ALERTS function available at the supervisor/manager terminal 18. The ALERTS function enables the system manager to specify events or system conditions to trigger a real-time notification system. The manager can set monitoring traps or conditions on the supervisor/manager terminal 18 that are activated by the occurrence or non-occurrence of specified events. The events may be defined in accordance with computerized autodialer parameters, on a per list basis, to monitor idle, wrap or talk times. For example, notification can be provided that the number of dropped calls has exceeded a preset quantity or a list can be automatically suspended when hold times exceed predefined limits. Notification is selectable and can be by means of an audible tone through an audible display device 11 and/or a screen notification (see FIGS. 6A–6C) such that the supervisor can immediately intervene and take corrective action suited to the situation at hand. Further, a script or userdefined program can be invoked upon an alert to automatically intervene and implement corrective action.

Figure 3D:
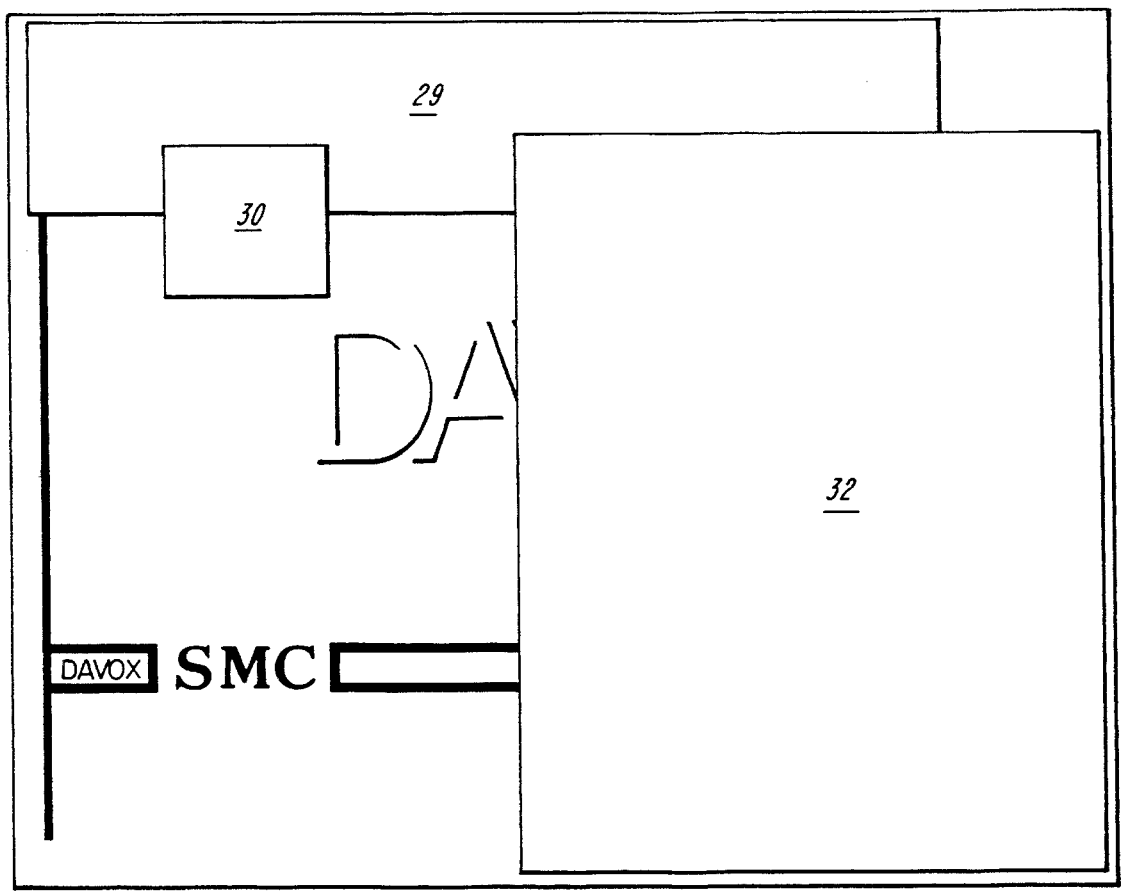
Figure 3E:
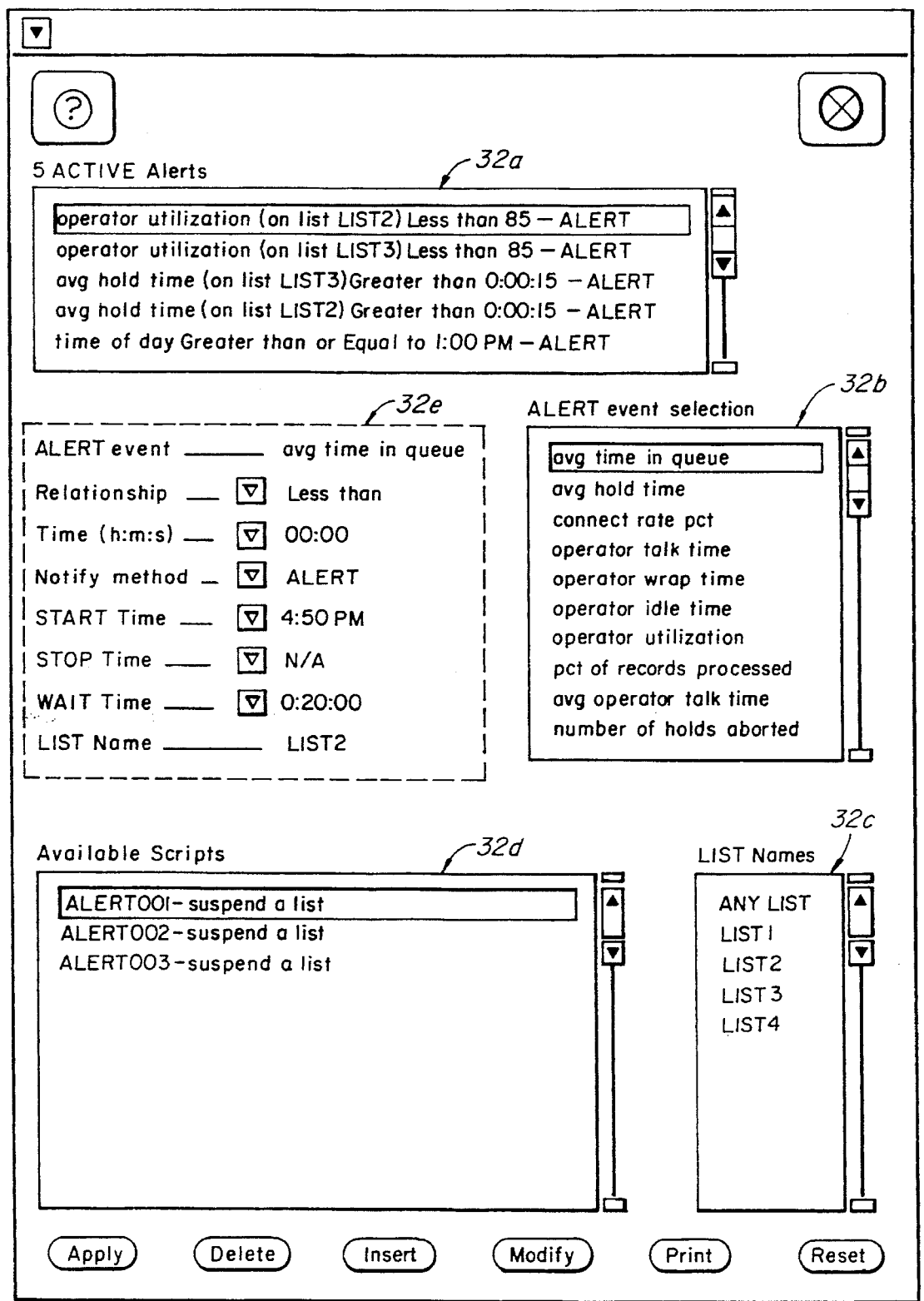

Referring now to FIGS. 3D and 3E, from the SYSTEM MANAGEMENT icon, the supervisor can pull down a menu and select "ALERTS" whereupon the ALERTS system functions become accessible. ALERTS comprises a series of related programs or functions. A first function permits a selectable alert to be stored in the database 220 from a file in the operating system. Thus, there is another function that manages the alerts in the database 220, facilitating deletion of alerts from the database 220. A function must run in the background to continually check the applicable system parameters for satisfaction of associated parameter conditions in the database 220. Finally, a notification function must be invoked upon satisfaction of an alert to provide the selected method of notification.

An ALERTS UTILITY screen 32, as illustrated in FIG. 3E, facilitates the menu-driven, creation, modification and deletion of an alert. An alert is created by selecting one of five\active alerts from an "ACTIVE ALERTS" list. Parameters for the selected alert can be established and "inserted" into the selected alert which can then be effected by designating that the system "apply" the alert as displayed. Point and click commands also permit alerts to be modified and deleted. The ALERTS UTILITY screen displays list names for all calling lists, active or suspended, which may be selected for applying an alert, at the creation of the alert. The supervisor/manager terminal\18 maintains a list of active alerts, which can be accessed via the ALERTS UTILITY screen and which are running or being checked in the background on the multitasking UNIX processor.

Figure 4A:
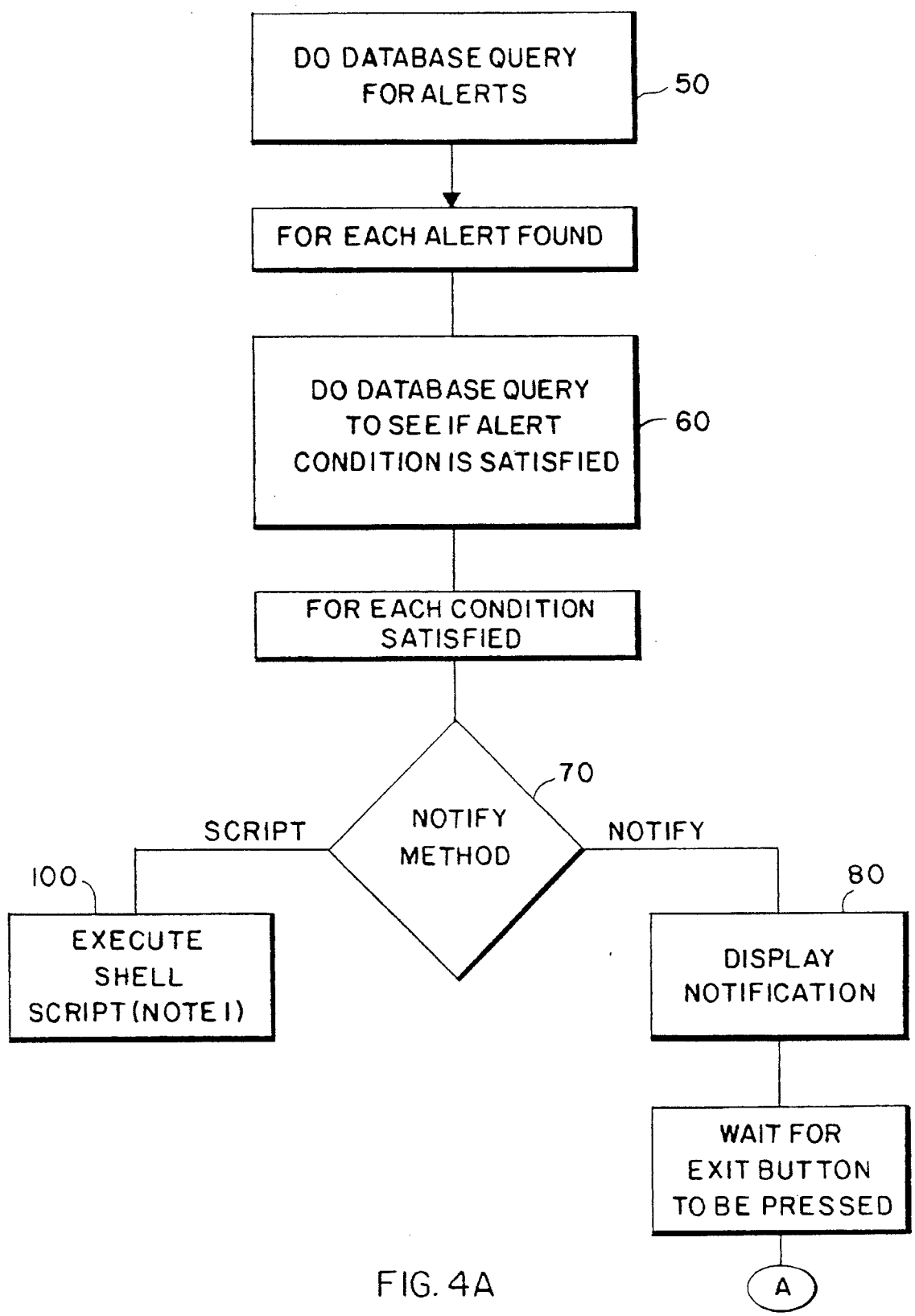
FIGS. 4A and 4B are flow diagrams of the alerts function in the system of FIG. 1.
Figure 4B:
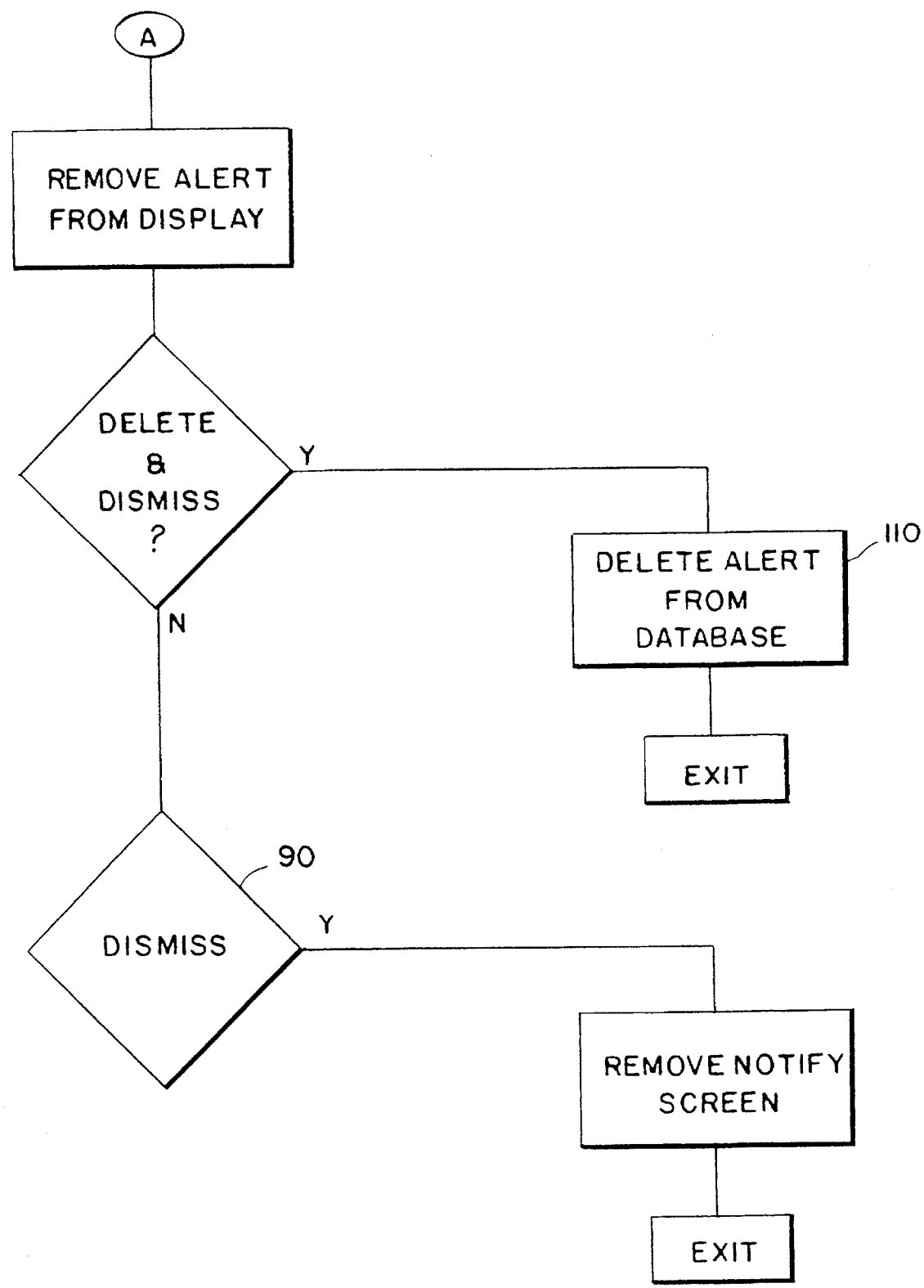
Figure 51:
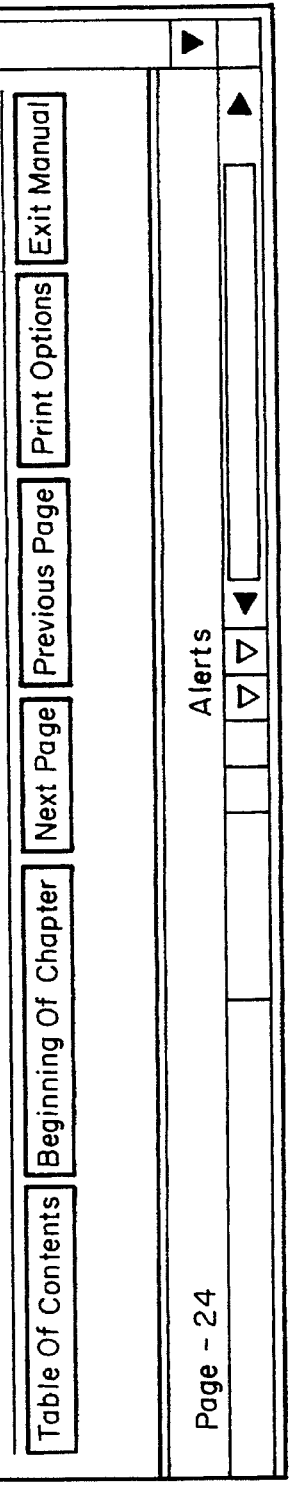
Figure 50:
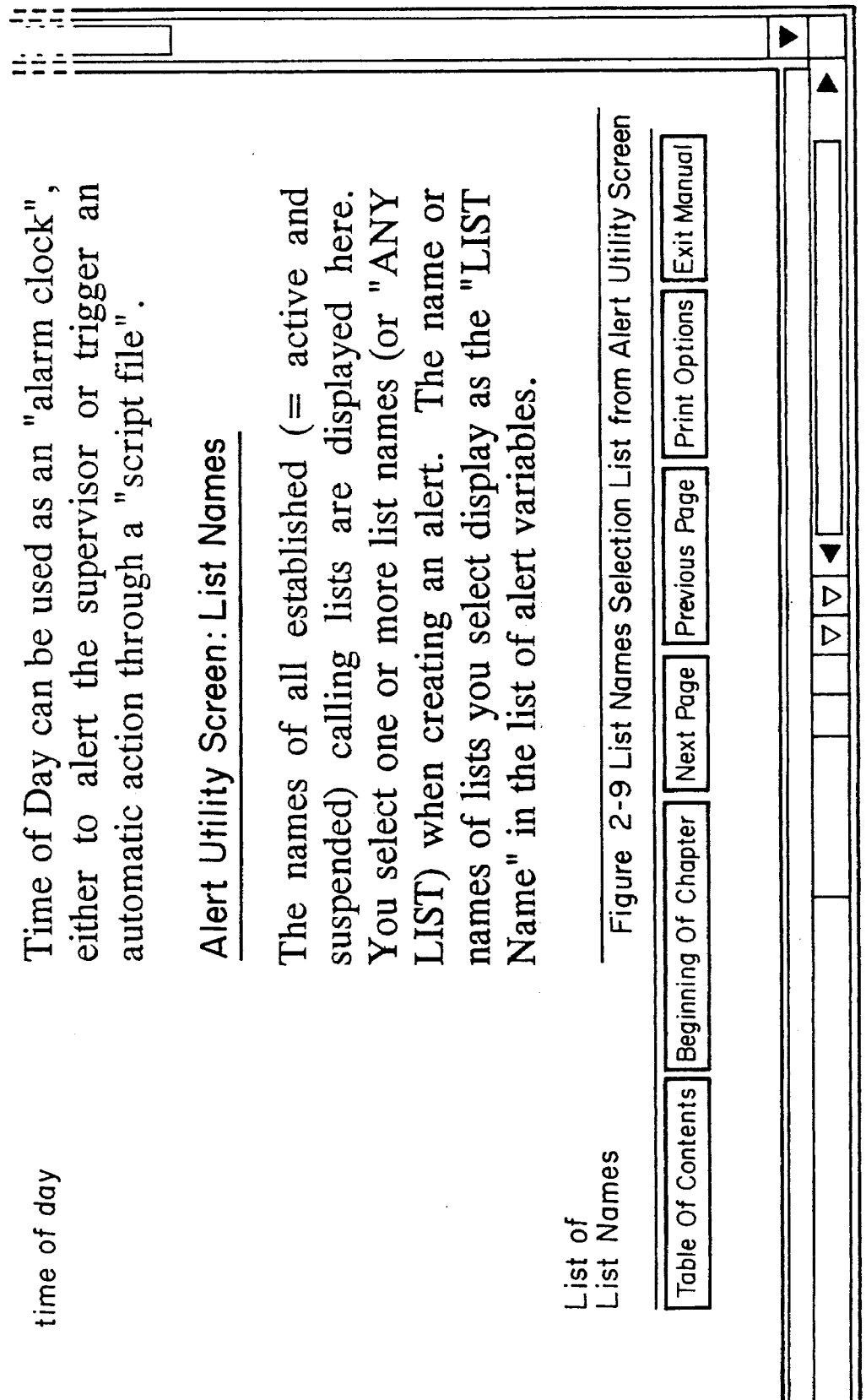
Figure 7:
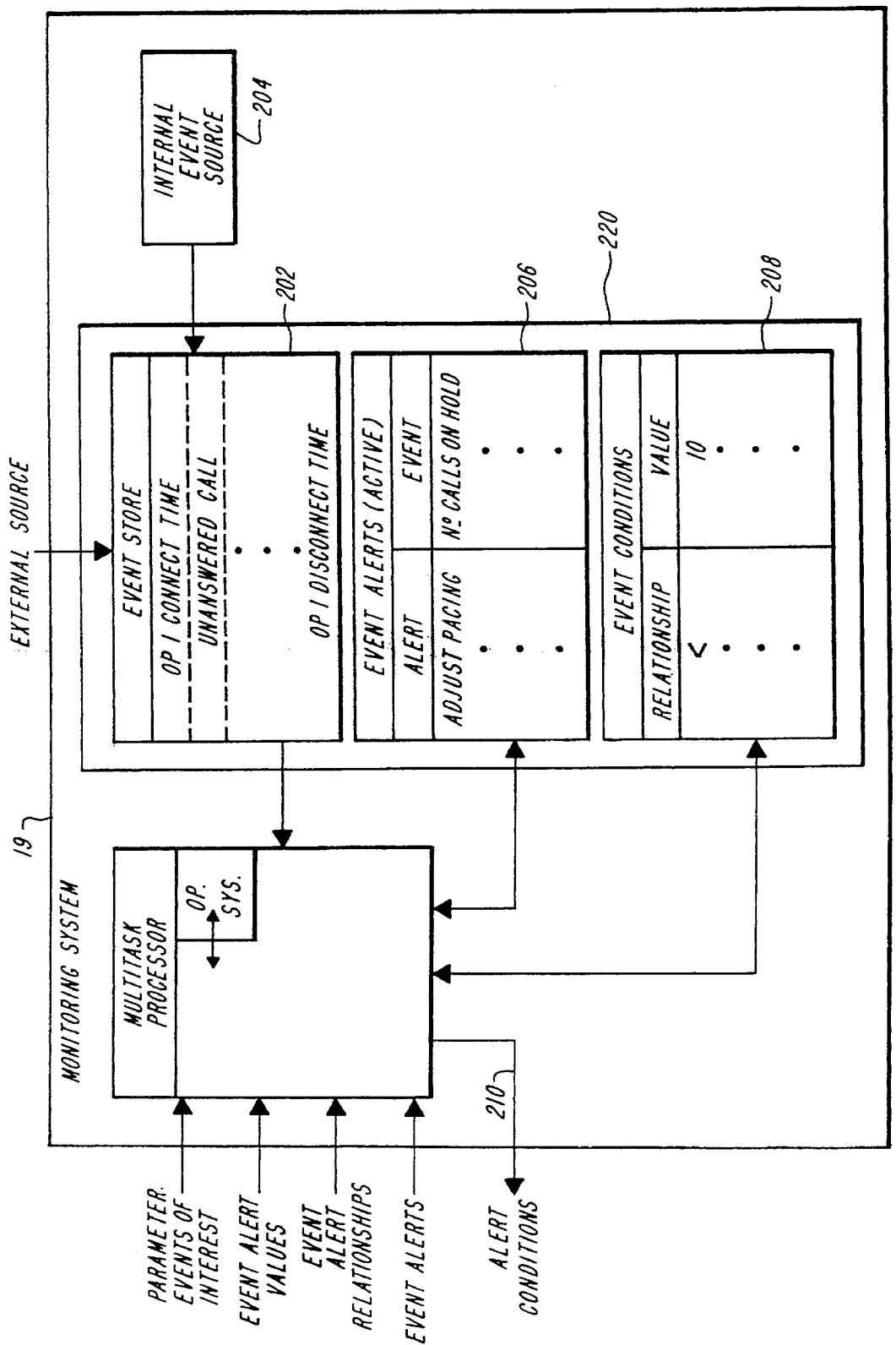
FIG. 7 is a block diagram of one embodiment of the monitoring system of the present invention.

A flow chart diagramming the alerts function(s) running in the system background is illustrated in FIGS. 4A and 4B and the block diagram in FIG. 7. As discussed hereinbefore, the database 206 management system records parameter event 202 data and information 204 associated with the autodialer 10 or event data 204 internal to the monitoring system itself. As the ALERTS UTILITY runs in the background, the database is queried 50 for the existence of alerts that may have been created by a supervisor via the supervisor/manager terminal 18 and associated with a given parameter, 206. When an alert is found in the database the pertinent parameter and event data/information stored in the database is queried and a comparison of the pertinent stored parameters and received event signals is done to determine if the parameter alert condition 208 is satisfied 60. Such a determination is made for each alert found. For each alert condition satisfied, an alert notification method or condition 210 is invoked 70 in accordance with the alert as created by the supervisor. The supervisor/manager terminal\\18 may beep and flash a message to notify 80 that a selected alert condition has been satisfied. Upon display, notification 80, the supervisor may use the mouse to point and click to stop the audible indicator by disabling the beeping at the supervisor/manager terminal 18. The supervisor may temporarily deactivate or dismiss 90 the alert for a selected period during which no further alerts in accordance with the particularly selected parameters will be notified.

The alert function may, for example, be configured to activate a user-defined program or "script" 100. Scripts are listed on the ALERTS UTILITY screen when available, and are invoked by setting the notify method to SCRIPT. Scripts can be written which impact or trigger off of any event selection in the ALERT event selection list. The scripts perform a specified operation when an alert is triggered and can be assigned during the definition of an alert to an alert which will invoke the script to correct a condition. Scripts may be used, for example, to assign a time of day at which a list is suspended, or to track hold times and terminate calls handled by the autodialer 10 so as to accelerate call pacing. Scripts may be standardized in accordance with significant parameters tracked by the autodialer 10 and maintained in the database. Alternatively, scripts may be customized and tailored to the particular hardware configuration and information tracking facility.

Upon receipt of an alert and invocation of a method of notification, a post alert wait time is established whereby the system will wait for a predetermined amount of time after sending an alert before checking the condition again. Such a delay gives the supervisor time to correct a condition or to delete or modify the alert.

Alerts are modified in the same way that they are created except that there is a modify selection which must be made instead of the insert selection as discussed hereinbefore with respect to creating alerts. It may be desirable at any time to delete an active alert whereupon, the manager can select the alert from the list of alerts, as illustrated in the ALERTS UTILITY screen and activate a delete function. The alert is thereby removed from the list and eliminated 110 from the database of alerts as described hereinbefore.

Although only three agents 12A–12C are shown, one of ordinary skill in the art can appreciate that such a system can serve many additional agents and that three are shown for illustrative purposes only.

While the system management center having a monitoring system 19 with alerts capabilities according to the invention is described in the context of a data processing device 2 having an auto-out-dialing telephony platform, it will be appreciated that such a system can be implemented in the context of an automated incoming call distribution facility or in the context of any other data processing system.

Although the ALERTS functions are described generally as functions or software modules, running in the background of a multitasking processor, it will be appreciated that hardware implementations can effect the functions as described and that hardwired state machines, microprocessors or the like can be used in a configuration to provide alerts according to the invention.

While the ALERTS system according to the invention is described as interrelated functions for creating, managing, checking and notifying alerts, it will be appreciated that any number of functions can be used to effect the alerts system as illustrated.

Although the invention has been shown and described with respect to exemplary embodiments thereof various other changes, omissions and additions in form and detail thereof may be made therein without departing from the spirit and scope of the invention.

APPENDIX I

System Definitions and Help Messages

ACTIVE ALERTS LIST:

The ACTIVE ALERTS list displays all currently programmed alerts. These alerts may be modified or deleted, and new alerts may be inserted into the list. (For procedures, see F1 help for DELETE, INSERT, and MODIFY command buttons.)

ALERT EVENT SELECTION LIST:

This list displays all of the types of events that can trigger alerts. To select a new type of event (to either modify an existing alert or create a new one), click on the event type with the left mouse button. (The highlighted selection will display next to the heading "ALERT event".)

LIST NAME SELECTION LIST:

This list displays a selection of calling lists to which an alert might apply. To select a new calling list or lists, (either to modify an existing alert or create a new one), click on the selection with the left mouse button. (The highlighted selection will display next to the heading "LIST name".) Note: Neither the list name selection list nor the list name heading will display if the event type is not list-related (e.g., time of day).

AVAILABLE SCRIPTS LIST:

Scripts are programs which can be assigned to alerts to perform specified operations. When an alert is triggered, the script assigned to the alert is invoked to correct the condition. (For example, a script might be assigned to a "time of day" alert to suspend a list at a certain time of the day.) To assign a script to an alert, set the Notify Method to SCRIPT, then highlight the desired script in the list of Available Scripts by clicking on it with the left mouse button.

RELATIONSHIP:

Click on the small triangle with the right mouse button to display the set of possible relationships (e.g., greater than, greater than or equal to, etc.) between an alert event and its alert value. To select a new relationship (to either modify an existing alert or create a new one), click on the selection with the left mouse button. (The highlighted selection will display button. (The highlighted selection will display next to the heading "Relationship").

PERCENTAGE:

The percentage value (e.g. % of aborts/connects, % on hold, etc.) for the alert is assigned here by dragging the marker along the scale with the left mouse button.

TIME (h:m:s):

The time value (e.g., length of talk time, idle time, etc.) for the alert is assigned here. Hold the RIGHT mouse button down on the TIME button to first display the hour menu. DRAG the pointer down to the desired hours. Moving the still depressed pointer to the right displays minutes, then seconds, etc. Release the right minutes, then seconds, etc. Release the right mouse button when the selection (hours, minutes, seconds) is correct. (Note that you do not have to specify minutes or seconds.)

NOTIFY METHOD—ALERT:

The supervisor is notified of an alert condition by a beep and a screen message. The supervisor is responsible for correcting the alert condition.

NOTIFY METHOD—SCRIPT:

The supervisor is notified that an alert condition has occurred, and that the "script" condition has occurred, and that the "script" (program) assigned to the alert is correcting the alert condition.

To select ALERT or SCRIPT, click on the small triangle with the right mouse button to display selections, then click on the selection. If SCRIPT is selected, assign a script to the alert by clicking on one of the Available Scripts with the left mouse button.

START TIME:

The time of day that the alert will become active is set here. Hold the RIGHT mouse button down on the START TIME button to first display the hour menu. DRAG the pointer down to the desired hours. Moving the still depressed pointer to the right displays minutes, the AM/PM. Release the right mouse minutes, then AM/PM, Release the right mouse button when the selection (hour, minute, AM/PM) is correct. (Note that you do not have to select the minute, or the AM/PM distinction. AM is the default). (Note: If the alert is always active, select N/A—not applicable—from the hour menu).

STOP TIME:

The time of day that the alert will become inactive is set here. Hold the RIGHT mouse button down on the START TIME button to first display the hour menu. DRAG the pointer down to the desired hour. Moving the still depressed pointer to the right displays minutes, then AM/PM. Release the right mouse minutes, then AM/PM. Release the right mouse button when the selection (hour, minute, AM/PM) is correct. (Note that you do not have to select the minute, or the AM/PM distinction. AM is the default). (Note: If the alert is always active, select N/A—not applicable—from the hour menu.) POST-ALERT WAIT TIME:

This is the time which the system will wait after sending an alert before it checks for the condition again. The purpose of the delay is to give the supervisor time to correct the condition (or delete or modify the alert). Hold the RIGHT mouse button down on the WAIT TIME button to first display the 24 hour menu. DRAG button to first display the 24 hour menu. DRAG the pointer down to the desired hour. Moving the still depressed pointer to the right displays minutes, then seconds. Release the right mouse button when the selection (hours, minutes, seconds) is correct. (Note that you do not have to specify minutes or seconds).

LIST NAME:

This is the list or lists (from the list name selection list) to which the alert applies. Note: Neither the list name selection list nor the list name heading will display if the event type is not list-related (e.g., time of day).

APPLY:

The APPLY button enters the commands or selections currently displayed on the screen. Click on the APPLY button with the left mouse button.

DELETE BUTTON:

To DELETE an alert, first highlight the alert in the ACTIVE list, then click on the DELETE button with the left mouse button.

INSERT BUTTON:

To create a new alert, first highlight any existing alert (for simplicity, choose an alert similar to the one you wish to create). Next, change any of the displayed parameters (ALERT event, Relationship, ALERT value, etc.). Once all the new values have been selected, click on the INSErT button with the left mouse button. The new alert inserted after the one you originally highlighted. The original remains unchanged.

MODIFY BUTTON:

To MODIFY an alert, first highlight the alert in the ACTIVE list. Next, change any of the displayed parameters (ALERT event, Relationship, ALERT value, etc.). Once all the new values have been selected, click on the MODIFY button with the left mouse button. The alert will redisplay in the active list with the new values.

PRINT BUTTON:

To print the list of active alerts, click on the PRINT button with the left mouse button.

RESET:

The RESET button restores selections to what they were the last time they were entered with the APPLY button. Click on the RESET button with the left mouse button. Note that if no changes have been made since the last time APPLY was selected, the RESET button will have no affect.

What is claimed is:

1. A telecommunications system comprising:

a computerized telephony system generating a plurality of parameter event signals indicative of various parameters of said computerized telephony system as said various parameters occur;

at least one agent terminal coupled to said computerized telephony system, for causing said telephony system to generate said plurality of parameter event signals indicative of various parameters of said telephony system and calls processed as said various parameters occur; and at least one supervisory terminal responsive to at least said computerized telephony system, said at least one supervisory terminal comprising:

a processor naming an operating system;

a mass storage device, responsive to said processor, said mass storage device receiving and storing at least some of said plurality of parameter event signals;

an input device, for inputting a plurality of data signals including at least one parameter event alert signal identifying an action to be initiated by said at least one supervisory terminal upon the comparison of a selectable telecommunication system parameter event with an established parameter event alert condition and for inputting at least one selectable parameter event alert relationship signal and at least one parameter event alert value signal, said at least one parameter event alert relationship and at least one parameter event alert value establishing at least one parameter event alert condition to which at least one corresponding parameter event is to be compared;

a parameter event and parameter event alert associator, for associating at least one parameter event alert with a selectable telecommunication parameter event signal; and a parameter event alert monitor, for performing a comparison of said plurality of parameter event signals with said established at least one parameter event alert condition, and for generating a signal indicative of a result of said comparison, said signal for initiating said action identified by said at least one parameter event alert signal.

2. The telecommunications system of claim 1 wherein said at least one parameter event alert signal identifies at least one task to be executed, and said processor of said at least one supervisory terminal selectably initiates execution of said at least one task in response to said result of said comparison.

3. The telecommunications system of claim 1 wherein said input device inputs a plurality of parameter event alert signals, and associates at least one of said plurality of parameter event alert signals with at least one selected telecommunication system parameter event.

4. The telecommunications system of claim 1 wherein said action identified by said at least one parameter event alert signal includes displaying a graphical display on a display device of said at least one supervisory terminal.

5. The telecommunications system of claim 4, wherein said display device includes a CRT display.

6. The telecommunications system of claim 1, wherein said action identified by said at least one parameter event alert signal is undertaken only at one of a plurality of supervisory terminals.

7. The telecommunications system of claim 1, wherein said telephony system includes an automated out-dialer.

8. The telecommunications system of claim 1, wherein said telephony system includes an inbound call handler.

9. A telephony system with real-time event detection and alert, comprising:

a telecommunication system, said telecommunication system generating a plurality of parameter event signals indicative of various parameters of said telecommunication system; and a real-time monitoring system including:

a parameter event signal receiver, coupled to said telecommunication system, for receiving said parameter event signals as said parameter event signals occur, each of said parameter event signals indicative of the occurrence of at least one corresponding parameter event occurring as a result of operation of said telecommunication system;

a plurality of parameter event alerts, each parameter event alert identifying a parameter event alert action to be initiated by said monitoring system upon the comparison of a selectable telecommunication system parameter event with an established parameter event alert condition;

a parameter event and parameter event alert associator, for associating at least one selected telecommunication system parameter event with at least one of said plurality of parameter event alerts;

at least one selectable parameter event alert relationship and at least one selectable parameter event alert value, for establishing at least one parameter event alert condition to which said at least one selected telecommunication system parameter event is to be compared;

a parameter event monitor, responsive to said received parameter event signals and to said at least one established parameter event alert condition, for comparing said received parameter event signals with said at least one established parameter event alert condition, and for providing at least a signal indicative of the detection of the occurrence of the at least one established parameter event alert condition as indicated by at least one of said plurality of received parameter event signals; and a parameter event alert initiator, responsive to said signal indicative of the detection of the occurrence of said established parameter event alert condition, for initiating the parameter event alert action identified by each parameter event alert associated with said at least one selected telecommunication system parameter event.

* * * * *